(12) United States Patent
Hu et al.

(10) Patent No.: US 10,860,040 B2
(45) Date of Patent: Dec. 8, 2020

(54) SYSTEMS AND METHODS FOR UAV PATH PLANNING AND CONTROL

(71) Applicant: SZ DJI TECHNOLOGY CO., LTD., Shenzhen (CN)

(72) Inventors: Xiao Hu, Shenzhen (CN); Ang Liu, Shenzhen (CN); Litian Zhang, Shenzhen (CN); Ketan Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 281 days.

(21) Appl. No.: 15/962,817

(22) Filed: Apr. 25, 2018

(65) Prior Publication Data

US 2018/0246529 A1   Aug. 30, 2018

Related U.S. Application Data

(63) Continuation of application No. PCT/CN2016/074830, filed on Feb. 29, 2016.

(30) Foreign Application Priority Data

Oct. 30, 2015  (WO) ................ PCT/CN2015/093459

(51) Int. Cl.
  *G05D 1/12*  (2006.01)
  *G05D 1/00*  (2006.01)
  *B64C 39/02*  (2006.01)
  *G05D 1/02*  (2020.01)

(52) U.S. Cl.
  CPC ............. *G05D 1/12* (2013.01); *B64C 39/024* (2013.01); *G05D 1/0016* (2013.01); *G05D 1/0038* (2013.01); *G05D 1/0202* (2013.01); *B64C 2201/123* (2013.01); *B64C 2201/128* (2013.01); *B64C 2201/146* (2013.01)

(58) Field of Classification Search
  CPC ...... G05D 1/12; G05D 1/0016; G05D 1/0038; G05D 1/0202; B64C 39/024
  See application file for complete search history.

(56) References Cited

U.S. PATENT DOCUMENTS

| 8,448,858 | B1 | 5/2013 | Kundu et al. |
| 8,902,233 | B1 | 12/2014 | Shen et al. |
| 9,164,506 | B1 | 10/2015 | Zang et al. |
| 9,165,361 | B1 | 10/2015 | Ely |

(Continued)

FOREIGN PATENT DOCUMENTS

| CN | 1617170 A | 5/2005 |
| CN | 101252687 A | 8/2008 |

(Continued)

OTHER PUBLICATIONS

"CN 103149939A Translation". Jun. 2013.

(Continued)

*Primary Examiner* — Hussein Elchanti

(74) *Attorney, Agent, or Firm* — Anova Law Group, PLLC

(57) ABSTRACT

A method for determining a target direction for a movable object includes providing an image on a computer-implemented display, obtaining a position of a selected point on the image in response to a user selecting the point on the image, and determining the target direction based on the position of the selected point on the image.

20 Claims, 21 Drawing Sheets

(56) References Cited

U.S. PATENT DOCUMENTS

| | | | |
|---|---|---|---|
| 9,367,067 B2 | 6/2016 | Gilmore et al. | |
| 10,012,982 B2* | 7/2018 | Kratz | G05D 1/0038 |
| 10,429,487 B1 | 10/2019 | Fowe | |
| 2004/0054473 A1 | 3/2004 | Shimomura | |
| 2007/0070190 A1 | 3/2007 | Yin et al. | |
| 2007/0093945 A1 | 4/2007 | Grzywna et al. | |
| 2008/0054158 A1 | 3/2008 | Ariyur et al. | |
| 2008/0055413 A1 | 3/2008 | Hayashi | |
| 2009/0080701 A1 | 3/2009 | Meuter et al. | |
| 2010/0017046 A1 | 1/2010 | Cheung et al. | |
| 2010/0094460 A1 | 4/2010 | Choi et al. | |
| 2010/0179691 A1 | 7/2010 | Gal et al. | |
| 2010/0228406 A1 | 9/2010 | Hamke et al. | |
| 2011/0046817 A1 | 2/2011 | Hamke et al. | |
| 2011/0142286 A1 | 6/2011 | Morriyama | |
| 2011/0279682 A1 | 11/2011 | Li et al. | |
| 2011/0304736 A1 | 12/2011 | Evans et al. | |
| 2012/0189162 A1 | 7/2012 | Sawada | |
| 2012/0288152 A1 | 11/2012 | Yano | |
| 2012/0316680 A1 | 12/2012 | Olivier, III et al. | |
| 2013/0101230 A1 | 4/2013 | Holeva et al. | |
| 2013/0118528 A1 | 5/2013 | Kim et al. | |
| 2013/0345920 A1 | 12/2013 | Duggan et al. | |
| 2014/0163775 A1 | 6/2014 | Metzler | |
| 2015/0117716 A1 | 4/2015 | Ursin et al. | |
| 2015/0142211 A1 | 5/2015 | Shehata et al. | |
| 2015/0341603 A1* | 11/2015 | Kasmir | H04M 1/0291 348/143 |
| 2016/0054733 A1* | 2/2016 | Hollida | G05D 1/0038 701/2 |
| 2016/0078610 A1 | 3/2016 | Rudd et al. | |
| 2016/0125249 A1 | 5/2016 | Mei et al. | |
| 2016/0127641 A1* | 5/2016 | Gove | G01B 11/00 348/143 |
| 2016/0304198 A1 | 10/2016 | Jourdan | |
| 2017/0070674 A1* | 3/2017 | Thurow | G06T 7/90 |
| 2017/0106537 A1* | 4/2017 | Chizeck | B25J 9/1689 |
| 2018/0129212 A1 | 5/2018 | Lee et al. | |
| 2018/0165815 A1 | 6/2018 | Okada et al. | |
| 2019/0025858 A1 | 1/2019 | Bar-Nahum et al. | |
| 2019/0156086 A1 | 5/2019 | Plummer et al. | |
| 2019/0265733 A1 | 8/2019 | Zhou et al. | |
| 2019/0277645 A1 | 9/2019 | Li et al. | |

FOREIGN PATENT DOCUMENTS

| | | |
|---|---|---|
| CN | 101614816 A | 12/2009 |
| CN | 101769754 A | 7/2010 |
| CN | 101860732 A | 10/2010 |
| CN | 102087530 A | 6/2011 |
| CN | 102629385 A | 8/2012 |
| CN | 102902282 A | 1/2013 |
| CN | 102955478 A | 3/2013 |
| CN | 102967305 A | 3/2013 |
| CN | 103149939 A | 6/2013 |
| CN | 103455797 A | 12/2013 |
| CN | 103530894 A | 1/2014 |
| CN | 103611324 A | 3/2014 |
| CN | 103822615 A | 5/2014 |
| CN | 103871075 A | 6/2014 |
| CN | 103914068 A | 7/2014 |
| CN | 104035446 A | 9/2014 |
| CN | 104217417 A | 12/2014 |
| CN | 104299244 A | 1/2015 |
| CN | 104361770 A | 2/2015 |
| CN | 204360218 U | 5/2015 |
| CN | 104714556 A | 6/2015 |
| CN | 104781781 A | 7/2015 |
| CN | 104786226 A | 7/2015 |
| CN | 104796611 A | 7/2015 |
| CN | 104820428 A | 8/2015 |
| CN | 104834307 A | 8/2015 |
| CN | 104853104 A | 8/2015 |
| CN | 104899554 A | 9/2015 |
| CN | 105371818 A | 3/2016 |
| CN | 107102647 A | 8/2017 |
| JP | H10141891 A | 5/1998 |
| JP | 2001306144 A | 11/2001 |
| JP | 2004042884 A | 2/2004 |
| JP | 2004112144 A | 4/2004 |
| JP | 2004355105 A | 12/2004 |
| JP | 2008136171 A | 6/2008 |
| JP | 2010202178 A | 9/2010 |
| JP | 2011233149 A | 11/2011 |
| JP | 2012144250 A | 8/2012 |
| JP | 2013177120 A | 9/2013 |
| JP | H10105712 A | 12/2013 |
| JP | 2014063411 A | 4/2014 |
| JP | 2014516816 A | 7/2014 |
| JP | 2014212479 A | 11/2014 |
| JP | 2014215196 A | 11/2014 |
| TW | 201235808 A | 9/2012 |
| WO | 2013051046 A1 | 4/2013 |
| WO | 2014200604 A2 | 12/2014 |
| WO | 2014200604 A3 | 3/2015 |
| WO | 2015105597 A2 | 7/2015 |
| WO | 2015105597 A3 | 10/2015 |
| WO | 2015105597 A4 | 12/2015 |

OTHER PUBLICATIONS

The World Intellectual Property Organization (WIPO) International Search Report for PCT/CN2015/100257 dated May 30, 2016 6 Pages (including translation).

The World Intellectual Property Organization (WIPO) International Search Report and Written Opinion for PCT/CN2015/089594 dated Jun. 3, 2016 7 Pages.

Yu-Fei Zha, et al., Fast Visual Tracking with Spatial Phase Correlation, ACTA Photonica Sinica, vol. 44, No. 7, Jul. 2015.

Yaskawanews, Yaskawa Electric Corporation, Japan, Nov. 20, 2008, 14 pages, Winter 2008, No. 285 https://www.yaskawa.co.jp/wp-content/uploads/2015/01/285.pdf.

Motoman Operation Education Manual YRC / DX / NX Common, Motoman Engineer, Japan, Ring Co., Ltd., Dec. 2017, pp. 2-1, 2-4, 7-5, 13-11, 13-12.

The World Intellectual Property Organization (WIPO) International Search Report and Written Opinion for PCT/CN2016/074830 dated Aug. 4, 2016 8 Pages.

The World Intellectual Property Organization (WIPO) International Search Report and Written Opinion for PCT/CN2015/093459 dated Jun. 22, 2016 9 Pages.

Syaril Azrad et al., Visual Servoing of an Autonomous Micro Air Vehicle for Ground Object Tracking, The 2009 IEEE/RSJ International Conference on Intelligent Robots and Systems, Oct. 2009, pp. 5321-5326.

Panagiotis Theodorakopoulos et al., A Strategy for Tracking a Ground Target with a UAV, 2008 IEEE/RSJ International Conference on Intelligent Robots and Systems, IEEE, 2008. (Year 2008).

* cited by examiner

SYSTEMS AND METHODS FOR UAV PATH PLANNING AND CONTROL

CROSS-REFERENCE TO RELATED APPLICATIONS

This application is a continuation of International Application No. PCT/CN2016/074830, filed on Feb. 29, 2016, which claims priority to International Application No. PCT/CN2015/093459, filed on Oct. 30, 2015, the entire contents of both of which are hereby incorporated by reference.

BACKGROUND

In some surveillance, reconnaissance, and exploration tasks for real-world applications, an aerial vehicle carrying a payload (e.g., a camera) may be controlled to move in different directions. Flight navigation methods may be based on global positioning system (GPS) data or camera vision. However, the development of practical applications for flight navigation has been hindered by an absence of an easy-to-use interactive control and guidance system. Presently, one or more operators may have to manually control the aerial vehicle such that it flies in a desired direction and/or avoid obstacles along the way. Presently known flight control systems generally require the operators to have some level of aviation experience or manual skill to operate the aerial vehicle, and offer limited real-time automatic control capability. The lack of an easy-to-use interactive control and guidance system may reduce the usefulness of aerial vehicles in certain applications.

SUMMARY

A need exists for flight control systems that are intuitive and easy to use, and that allows a human to manage and operate an aerial vehicle through interaction with a human-system interface. The burden of manually piloting the aerial vehicle on a user can be significantly reduced, thus allowing the user to more readily focus on payload or mission operation, such as visually monitoring and/or taking aerial imagery of objects from the aerial vehicle.

Another need exists to improve the autonomous flight capabilities and robustness of an aerial vehicle, under different conditions for a variety of applications. The applications may include effecting movement of the aerial vehicle in a target direction. The conditions may include indoor and/or outdoor environments, places with or without GPS signals or places that have poor GPS signal reception, a variety of different terrain, obstacles in the motion path, etc. The obstacles may be stationary or capable of movement. One or more obstacles may lie along and/or appear in the direction of travel of the aerial vehicle. In some cases, the obstacles may be a fast-moving group of objects, whereby the size and/or shape of the group can be amorphous and change over time as the objects move. Accordingly, there exists a need to automatically detect the obstacles in or near real-time, and adjust the motion path of the aerial vehicle in a controlled manner to avoid collision.

Systems, methods, and devices are provided herein having improved flight control capabilities that address at least the above needs. The improved tracking capabilities can be incorporated into an aerial vehicle, such as an unmanned aerial vehicle (UAV). The improved tracking capabilities may include "tap-and-go" functions, whereby a user can tap a point on an image displayed on a user terminal, to instruct a movable object to automatically move towards and/or in a target direction. In some cases, a motion path can be automatically generated for the movable object to arrive at a reference point based on the target direction, without requiring manual flight input and/or operation by a user. The motion path may define a smooth curvilinear trajectory from a position of the movable object to the reference point. The motion path can be optimized based on one or more motion characteristics of the movable object, power consumption, ease of maneuver of the movable object along the motion path, orientation of the movable object, and/or other parameters.

In some cases, the improved flight control capabilities can enable automatic detection of one or more obstacles along the motion path, and adjustment of the motion path to avoid the one or more obstacles. Such capabilities may be particularly useful when the movable object is moving in a target direction in an unknown environment or in an environment that has poor GPS signal reception, or one that contains a number of obstacles.

For instance, in some aspects of the disclosure, a method for controlling a movable object is provided. The method may comprise: estimating a reference point for the movable object, and one or more motion characteristics of the movable object at the reference point based on a target direction; and generating a motion path for the movable object from a position of the movable object to the reference point, based on one or more motion characteristics of the movable object at the position and the reference point.

According to an aspect of the disclosure, an apparatus for controlling a movable object is provided. The apparatus may comprise one or more processors that are, individually or collectively, configured to: estimate a reference point for the movable object, and one or more motion characteristics of the movable object at the reference point based on a target direction; and
generate a motion path for the movable object from a position of the movable object to the reference point, based on one or more motion characteristics of the movable object at the position and the reference point.

According to another aspect of the disclosure, a non-transitory computer-readable medium storing instructions that, when executed, causes a computer to perform a method for controlling a movable object, is provided. The method may comprise: estimating a reference point for the movable object, and one or more motion characteristics of the movable object at the reference point based on a target direction; and generating a motion path for the movable object from a position of the movable object to the reference point, based on one or more motion characteristics of the movable object at the position and the reference point.

An unmanned aerial vehicle (UAV) system may be provided in accordance with an additional aspect of the disclosure. The system may comprise: an apparatus operable to control the UAV, said apparatus comprising one or more processors that are, individually or collectively, configured to: estimate a reference point for the UAV, and one or more motion characteristics of the UAV at the reference point based on a target direction; and generate a motion path for the UAV from a position of the UAV to the reference point, based on one or more motion characteristics of the UAV at the position and the reference point.

Further aspects of the disclosure may be directed to a method for determining a target direction for a movable object. The method may comprise: providing an image on a computer-implemented display; obtaining a position of a selected point on the image when a user selects the point on the image; and determining the target direction based on the position of the selected point on the image.

According to an aspect of the disclosure, an apparatus for determining a target direction for a movable object is provided. The apparatus may comprise one or more processors that are, individually or collectively, configured to: provide an image on a computer-implemented display; obtain a position of a selected point on the image when a user selects the point on the image; and determine the target direction based on the position of the selected point on the image.

According to another aspect of the disclosure, a non-transitory computer-readable medium storing instructions that, when executed, causes a computer to perform a method for determining a target direction for a movable object, is provided. The method may comprise: providing an image on a computer-implemented display; obtaining a position of a selected point on the image when a user selects the point on the image; and determining the target direction based on the position of the selected point on the image.

An unmanned aerial vehicle (UAV) system may be provided in accordance with an additional aspect of the disclosure. The system may comprise: an apparatus operable to control the UAV, said apparatus comprising one or more processors that are, individually or collectively, configured to: provide an image on a computer-implemented display; obtain a position of a selected point on the image when a user selects the point on the image; and determine the target direction based on the position of the selected point on the image.

Further aspects of the disclosure may be directed to a method for implementing obstacle avoidance of a movable object within an environment. The method may comprise: determining whether the movable object will collide with one or more obstacles based on a predicted movement of the movable object along a motion path; adjusting the motion path incrementally in at least one direction when the movable object is determined to collide with the one or more obstacles; and determining, for each incremental angle in the at least one direction, whether the movable object is going to collide with the one or more obstacles.

According to an aspect of the disclosure, an apparatus for implementing obstacle avoidance of a movable object within an environment is provided. The apparatus may comprise one or more processors that are, individually or collectively, configured to: determine whether the movable object will collide with one or more obstacles based on a predicted movement of the movable object along a motion path; adjust the motion path incrementally in at least one direction when the movable object is determined to collide with the one or more obstacles; and determine, for each incremental angle in the at least one direction, whether the movable object is going to collide with the one or more obstacles.

According to another aspect of the disclosure, a non-transitory computer-readable medium storing instructions that, when executed, causes a computer to perform a method for implementing obstacle avoidance of a movable object within an environment is provided. The method may comprise: determining whether the movable object will collide with one or more obstacles based on a predicted movement of the movable object along a motion path; adjusting the motion path incrementally in at least one direction when the movable object is determined to collide with the one or more obstacles; and determining, for each incremental angle in the at least one direction, whether the movable object is going to collide with the one or more obstacles.

An unmanned aerial vehicle (UAV) system may be provided in accordance with an additional aspect of the disclosure. The system may comprise: an apparatus operable to implement obstacle avoidance of the UAV within an environment, said apparatus comprising one or more processors that are, individually or collectively, configured to: determine whether the movable object will collide with one or more obstacles based on a predicted movement of the movable object along a motion path; adjust the motion path incrementally in at least one direction when the movable object is determined to collide with the one or more obstacles; and determine, for each incremental angle in the at least one direction, whether the movable object is going to collide with the one or more obstacles.

Further aspects of the disclosure may be directed to a method for controlling a movable object within an environment. The method may comprise: generating a motion path of the movable object based on a target direction within the environment and one or more motion characteristics of the movable object; and determining, using an environmental map representative of at least a portion of the environment, a probability of collision of the movable object with one or more obstacles, wherein the probability is determined based on a predicted movement of the movable object along the motion path and a predicted movement of the one or more obstacles onto the motion path.

According to an aspect of the disclosure, an apparatus for controlling a movable object within an environment is provided. The apparatus may comprise one or more processors that are, individually or collectively, configured to: generate a motion path of the movable object based on a target direction within the environment and one or more motion characteristics of the movable object; and determine, using an environmental map representative of at least a portion of the environment, a probability of collision of the movable object with one or more obstacles, wherein the probability is determined based on a predicted movement of the movable object along the motion path and a predicted movement of the one or more obstacles onto the motion path.

According to another aspect of the disclosure, a non-transitory computer-readable medium storing instructions that, when executed, causes a computer to perform a method for controlling a movable object within an environment is provided. The method may comprise: generating a motion path of the movable object based on a target direction within the environment and one or more motion characteristics of the movable object; and determining, using an environmental map representative of at least a portion of the environment, a probability of collision of the movable object with one or more obstacles, wherein the probability is determined based on a predicted movement of the movable object along the motion path and a predicted movement of the one or more obstacles onto the motion path.

An unmanned aerial vehicle (UAV) system may be provided in accordance with an additional aspect of the disclosure. The system may comprise: an apparatus operable to control the UAV within an environment, said apparatus comprising one or more processors that are, individually or collectively, configured to: generate a motion path of the movable object based on a target direction within the environment and one or more motion characteristics of the movable object; and determine, using an environmental map representative of at least a portion of the environment, a probability of collision of the movable object with one or more obstacles, wherein the probability is determined based on a predicted movement of the movable object along the motion path and a predicted movement of the one or more obstacles onto the motion path.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems, methods, and devices provided herein can be used to improve the ease of operation of movable objects. The control systems provided herein are intuitive and easy to use, and allows a user to manage and operate a movable object through interaction with a graphical human-system interface. A motion path can be automatically generated for a movable object based on a target direction determined from an input to the graphical human-system interface. The motion path can be automatically adjusted to prevent the movable object from colliding with one or more obstacles. Accordingly, the burden of manually piloting the movable object can be significantly reduced, thus allowing the user to more readily focus on payload or mission operation, such as visually monitoring and/or taking aerial imagery of objects. The improved capabilities can be incorporated into any type of aerial vehicle such as unmanned aerial vehicles (UAVs).

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
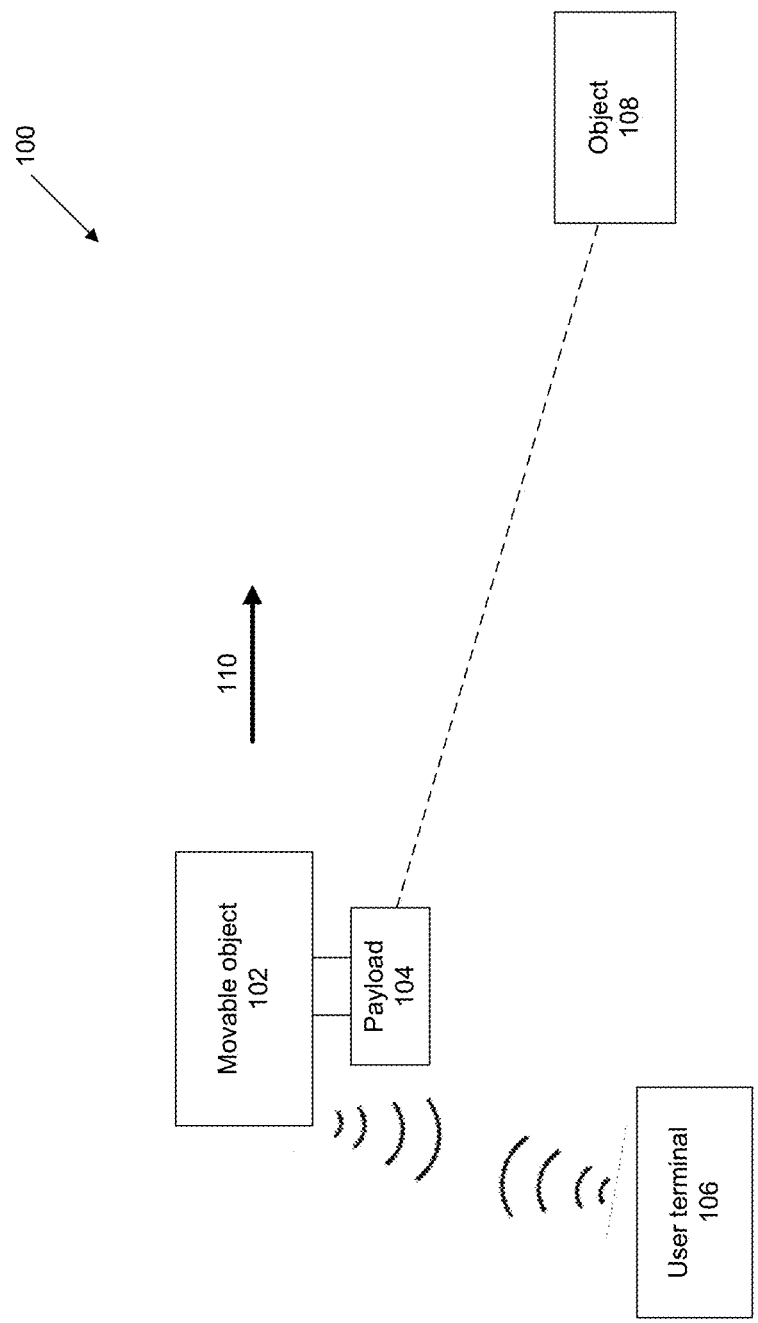
FIG. 1 shows an example of a system used in visual interactive navigation, in accordance with some embodiments.

FIG. 1 shows an example of a system used in visual navigation. The visual navigation system 100 may include a movable object 102 and a user terminal 106 capable of two-way communication with the movable object. The movable object may be configured to carry a payload 104. The user terminal can be used to control one or more motion characteristics of the movable object and/or the payload. For example, the user terminal can be used to control the movable object such that the movable object is able to navigate in a specified direction 110 within the environment. The specified direction may be a target direction determined from a user input to the user terminal. One or more objects 108 may be located within the environment. In some cases, the user terminal can be used to control the movable object such that the movable object is able to navigate towards, track, follow, or acquire data (e.g., image data) associated with the object.

The movable object 102 may be any object capable of traversing an environment. The movable object may be capable of traversing air, water, land, and/or space. The environment may include stationary objects and objects that are capable of motion. Examples of stationary objects may include geographic features, plants, landmarks, buildings, monolithic structures, or any fixed structures. Examples of objects that are capable of motion may include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object 102 may be a vehicle. The vehicle may be a self-propelled vehicle. The vehicle may traverse an environment with aid of one or more propulsion units. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing within an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may also be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

The movable object may support an on-board payload 104. The payload may have a fixed position relative to the movable object, or may be movable relative to the movable object. The payload may spatially translate relative to the movable object. For instance, the payload may move along one, two or three axes relative to the movable object. The payload may also rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment.

One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD)

sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The movable object may be capable of communicating with the user terminal 106. The user terminal may communicate with the movable object itself, with a payload of the movable object, and/or with a carrier of the movable object, wherein the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be wireless communications. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. In some cases, the user terminal may be located remotely from a human user, and the user can control the user terminal using wireless and/or wired communications. Various examples, and/or characteristics of user terminals are provided in greater detail elsewhere herein.

The user terminals may include one or more processors that may be capable of executing non-transitory computer readable media that may provide instructions for one or more actions. The user terminals may include one or more memory storage devices comprising non-transitory computer readable media including code, logic, or instructions for performing the one or more actions. The user terminal may include software applications that allow the user terminal to communicate with and receive imaging data from a movable object. The user terminals may include a communication unit, which may permit the communications with the movable object. In some instances, the communication unit may include a single communication module, or multiple communication modules. In some instances, the user terminal may be capable of interacting with the movable object using a single communication link or multiple different types of communication links.

The user terminal may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a graphical user interface (GUI). The GUI may show an image that may permit a user to control actions of the UAV. For instance, the user may select a direction of travel for the movable object from the image. The user may select a portion of the image (e.g., point, region, and/or object) to define the target direction. The user may select the target direction by directly touching the screen (e.g., touchscreen). The user may touch a portion of the screen, for example by touching a point on the screen. Alternatively, the user may select a region on a screen from a pre-existing set of regions, or may draw a boundary for a region, a diameter of a region, or specify a portion of the screen in any other way. The user may select the target direction by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view collected with aid of a payload of the movable object. For instance, an image captured by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or generated by) different imaging devices, which may have different field of views. A user at a user terminal may select a portion of the image collected by the imaging device to specify a target and/or direction of motion by the movable object.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the movable object relative to the environment, the imaging device relative to the environment, and/or the movable object relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional (2D) map or a three-dimensional (3D) map. The views may be toggled between a two-dimensional and a three-dimensional map view, or the two-dimensional and three-dimensional map views may be shown simultaneously. A user at a user terminal may select a portion of the map to specify a target and/or direction of motion by the movable object. The views may be toggled between one or more FPV and one or more map view, or the one or more FPV and one or more map view may be shown simultaneously. The user may make a selection of a target or direction using any of the views. The portion selected by the user may include the target and/or direction. The user may select the portion using any of the selection techniques as described.

In some embodiments, the image may be provided in a 3D virtual environment that is displayed on the user terminal (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user at a user terminal can manipulate the points or objects in the virtual environment to control a motion path of the movable object and/or motion characteristic(s) of the movable object.

The user terminal may optionally be used to control the movement of the movable object, such as the flight of the movable object. The user terminal may permit a user to manually directly control flight of the movable object. Alternatively, a separate device may be provided that may allow a user to manually directly control flight of the movable object. The separate device may or may not be in communication with the user terminal. The flight of the movable object may optionally be fully autonomous or semi-autonomous. The user terminal may optionally be used to control any component of the movable object (e.g., operation of the payload, operation of the carrier, one or more sensors, communications, navigation, landing stand, actuation of one or more components, power supply control, or any other function). Alternatively, a separate device may be used to control one or more components of the movable object. The separate device may or may not be in communication with the user terminal. One or more components may be controlled automatically with aid of one or more processors.

The target direction 110 may be selected by a user. The movable object may travel in the target direction. The target direction may be selected by a user selecting a portion of an image (e.g., in FPV or map view). The movable object may travel in the target direction until a countermanding instruction is received or when a countermanding condition is realized. For instance, the movable object may automatically travel in the target direction until a new direction is input. The movable object may travel in the target direction until a different flight mode is selected. For instance, the user may take manual control over the flight of the movable object.

Restrictions may be provided for the travel of the movable object. In another instance, a condition may be detected in which a flight restriction may apply. As described in greater detail below, obstacle avoidance may occur when undergoing target or direction tracking. Additional limitations such as flight ceilings, flight floors, limited range, or other types of flight restrictions may apply.

Figure 2:
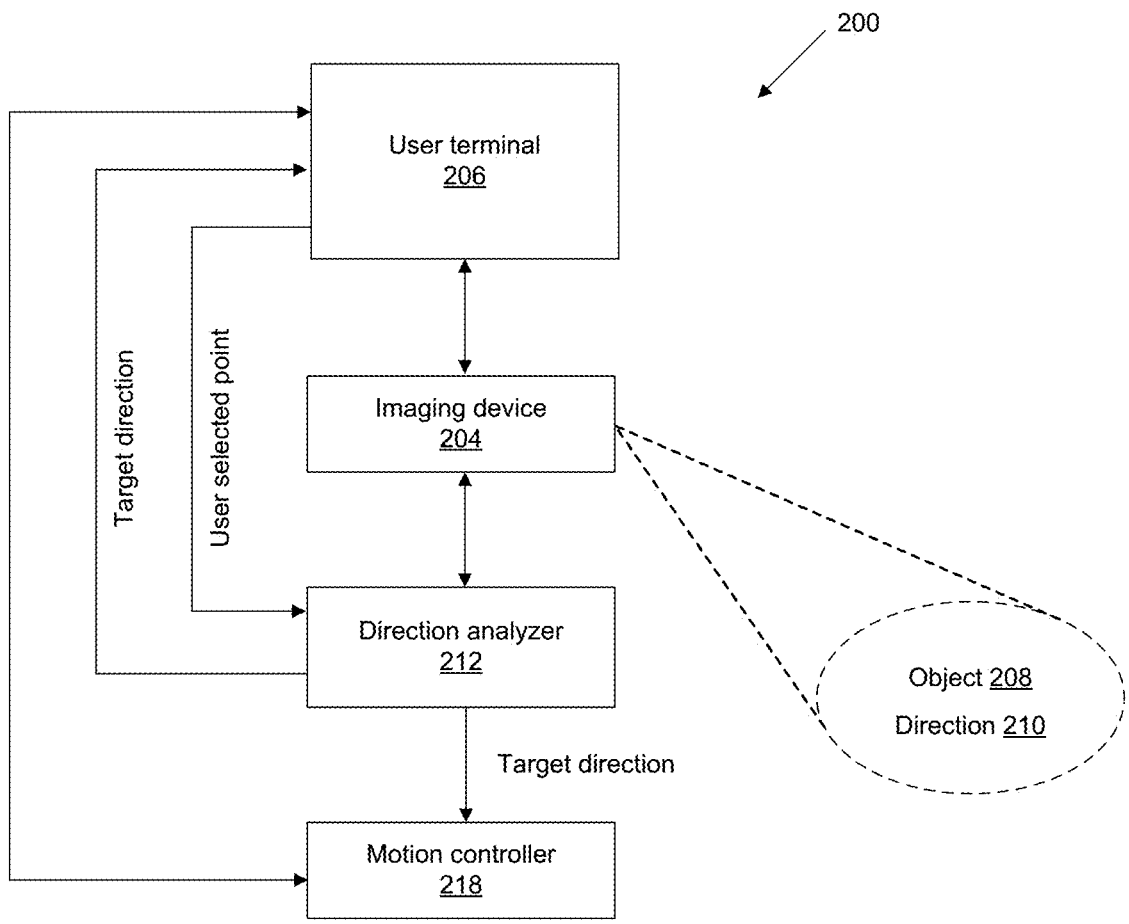
FIG. 2 shows an example of communications that can occur within a visual interactive navigation system, in accordance with some embodiments.

FIG. 2 shows an example of communications that may occur within a visual navigation system. Within a visual navigation system 200, a user terminal 206 may be provided and configured to accept an input from one or more users. The user terminal may be in communication with a movable object. For example, the user terminal may be in communication with an imaging device 204 and a motion controller 218 onboard the movable object. The visual navigation system may further include a direction analyzer 212 in communication with the user terminal, the imaging device, and the motion controller. The direction analyzer may or may not be part of the motion controller. The direction analyzer can be configured to determine a target direction for the movable object, based on a user input to the user terminal and one or more images obtained by the imaging device. The imaging device can capture images which may include portions indicative of one or more objects 208 and/or one or more direction(s) 210.

The user terminal may include an output device. The output device may be a display, such as a screen. The screen can also serve as an input device. A user may interact with the user terminal via the screen. For example, when the output device is a touchscreen, a user can manipulate visual objects in a graphical user interface (GUI) on the touchscreen by selecting (clicking or touching) the visual objects through a variety of actions. Examples of those actions may include selecting one or more points or objects, draw a shape, drag-and-drop, translate, rotate, spin, push, pull, zoom-in, zoom-out, etc. Any type of user action in the GUI may be contemplated. A user at a user terminal can manipulate the visual objects in the GUI to control a direction, motion path, tracking function, and/or motion characteristic(s) of the movable object.

The display may have any characteristics as described elsewhere herein. The display may be incorporated into the user terminal or may be provided separately from the rest of the user terminal. When provided separately from the rest of the user terminal, the display may communicate with the user terminal. Two-way communications may optionally be provided between the output device and the rest of the user terminal.

The user terminal may be configured to display, on the output device, one or more images through which a user can select a target direction. As previously described, the images may include FPVs and/or map views. The image may include a live-image or visual representation of a target direction after the target direction has been selected. The target direction may be determined when a user makes a selection in the image. For example, a portion of an image selected by the user may constitute a target direction.

One or more imaging devices 204 may be provided. The one or more imaging devices may have substantially the same field of view or different fields of view. One or more imaging devices may be movable relative to the movable object, while one or more imaging devices may be stationary relative to the movable object. In one example, one or more of the imaging devices may be supported by a carrier that may permit movement of the imaging device relative to the movable object. One or more of the imaging devices may be directly on the movable object, move in the same direction and speed as the movable object, and/or may not move relative to the movable object.

One or more imaging devices may capture images of an environment. The environment may include one or more objects 208. The directions 210 can be defined or determined when the user makes a selection within the image. The target directions may be defined or determined from images of the one or more objects. The image data captured by the one or more imaging devices may correspond to, for example, still images or video frames of the one or more objects. The objects may include any physical object or structure that can be optically imaged by the movable object. The objects can be depicted in still images and/or video frames in a 2D or 3D format, can be real-life and/or animated, can be in color, black/white, or grayscale, can be in any color space, or can be in a wireframe model. Images from the one or more imaging devices may be transmitted from the imaging devices to the user terminal, to be rendered on an output device of the user terminal.

Image data can be transmitted from the imaging device to the direction analyzer 212. The direction analyzer can be on-board the imaging device, on-board a carrier, on-board the movable object, or an external device (e.g., user terminal, server, etc.). In some embodiments, the direction analyzer may be located remotely from the imaging device. For example, the direction analyzer may be disposed in a remote server that is in communication with the imaging device. The direction analyzer may be provided at any other type of external device (e.g., a remote controller for the movable object, a base station having a reference location, etc.), or may be distributed on a cloud computing infrastructure. In some embodiments, the direction analyzer and the motion controller may be located on a same device. In other embodiments, the direction analyzer and the motion controller may be located on different devices. The direction analyzer and the motion controller may communicate either via wired or wireless communication channels. In some embodiments, the direction analyzer may be located on the movable object. For example, the direction analyzer may be disposed in a housing of the movable object. In some further embodiments, the direction analyzer may be disposed at a base station that is in communication with the movable object. The direction analyzer may be located anywhere, as long as the direction analyzer is capable of: (i) receiving image data from the imaging device, (ii) receiving an input from the user terminal, whereby the input is used to determine a target direction, (iii) analyzing the input with reference to the image data to determine the target direction in both a camera coordinate system and a world coordinate system, and (iv) transmitting the target direction to the motion controller and the user terminal. In some cases, the user terminal may be configured to display the target direction as a graphical element on the rendered image. The motion controller may be configured to effect movement of the movable object based on the target direction.

In some embodiments, the image data captured by the imaging device may be stored in a media storage (not shown) before the image data is provided to the direction analyzer. The direction analyzer may be configured to receive the image data directly from the media storage. In some embodiments, the direction analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the direction analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can be a computer capable of providing image data to the direction analyzer.

As another example, the media storage can be a web server, an enterprise server, or any other type of computer server. The media storage can be computer programmed to accept requests (e.g., HTTP, or other protocols that can initiate data transmission) from the direction analyzer and to serve the direction analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device via a peer-to-peer network architecture. In some embodiments, the media storage may be implemented using a cloud computing architecture.

The image data may be provided (e.g., in the form of image signals) to the direction analyzer for processing/analysis to determine a target direction. In some examples, the direction analyzer can be implemented as a software program executing in a processor and/or as hardware that analyzes one or more image frames to determine a target direction.

The direction analyzer may be further configured to determine the relative positions between the movable object and the target direction. In some instances, the direction analyzer may determine a position of the imaging device and/or movable object with respect to the environment (e.g., an inertial reference frame) and/or one another. The direction analyzer may determine a vector of the target direction within the environment (e.g., an inertial reference frame) and/or with respect to the movable object (which may include an imaging device supported by the movable object). Optionally, data from one or more additional sensors and/or external devices may be used to aid in determination of positional information by the direction analyzer (for example, IMU data or data from any other sensors as described elsewhere herein). As previously described, positional information may include spatial location (e.g., in reference to one, two or three axes), attitude (e.g., relative to one, two or three axes), linear velocity, angular velocity, linear acceleration, and/or angular acceleration.

Image frames from the imaging device may be displayed on the output device of the user terminal. For example, a map may be displayed that is indicative of the environment and/or positions of various objects and/or the movable object within the environment. The map may be a 2D map or a 3D map. The map may be displayed on the output device. Data from the direction analyzer may be provided directly to the user terminal which may display it on its output device without requiring any intermediary analysis or processing. For instance, data indicative of the target direction may be transmitted from the direction analyzer, to be displayed on the output device of the user terminal.

The data from the direction analyzer may be provided to the motion controller. The motion controller may be provided on-board the movable object, on-board the carrier, on-board the imaging device, and/or on an external device or network. The motion controller may control flight of the movable object. Optionally, the motion controller may generate one or more flight instructions to be provided to one or more propulsion units of the movable object. The motion controller may optionally generate a motion path for the movable object. The motion path may be substantially fixed, or may be variable or dynamic. The motion path may include a heading in a target direction. The motion path may remain heading in the target direction until a countermanding condition is detected (e.g., a further input is detected or a flight restriction applies). The motion controller may be in communication with one or more propulsion units of the movable object (not pictured).

Optionally, information from one or more sensors may be provided to the motion controller. For example, information from one or more sets of IMUs may be provided to the motion controller. The one or more sets of IMUs may be on-board the movable object, on-board a carrier and/or on-board a payload. The data from the IMUs may be indicative of positional information of the movable object, the carrier, and/or the payload. The motion controller may optionally use the information from the one or more sensors in controlling motion of the movable object. Optionally the information from the one or more sensors may be used to control position of the imaging device relative to the movable object and/or its environment.

The motion controller may receive information from the user terminal. The motion controller may receive information indicative of the user selection of a target direction. The motion controller may generate a motion path and/or control motion of the movable object in response to the user selection of the target direction.

Information from the motion controller may optionally be provided to the user terminal. For instance, a user terminal may receive information about a motion path. The motion path and/or heading may optionally be displayed on the output device.

While shown in FIG. 2 as separate components that are operatively connected, it is understood that the as-shown configuration is for illustrative purposes only. Certain components or devices may be removed or combined, and other components or devices may be added.

A method for determining a target direction for a movable object (such as a UAV) can be implemented using the system of FIG. 2. The method may include providing an image on a computer-implemented display, obtaining a position of a selected point on the image when a user selects the point on the image, and determining the target direction based on the position of the selected point on the image. The target direction may be generated using, for example direction analyzer 212.

The image can be captured by an imaging device (e.g., imaging device 204) onboard a movable object. The image may visually depict a portion of an environment within which the movable object moves. The image may depict a first-person view (FPV) taken from the movable object. Optionally, the image may be an environmental map of the environment. The environmental map may be a topological map. The environmental map may also comprise a metric map. The metric map may comprise at least one of the following: a point cloud, a 3D grid map, a 2D grid map, or a 2.5D grid map. In some instances, the metric map may comprise an occupancy grid map.

The image data may be transmitted directly or indirectly from the imaging device and/or the movable object to a user terminal (e.g., user terminal 206). The computer-implemented display may be a touchscreen device in the user terminal. The image may be rendered substantially in or near real-time on the computer-implemented display. A user can control the movable object to move in a target direction, by selecting a point or a portion of the image associated with the target direction, as described in detail below.

Various types of coordinate systems can be employed to select a target direction, and to effect movement of the movable object in the target direction. For instance, one or more coordinate systems may be local to an imaging device, and/or the movable object. One or more coordinate systems may include global coordinate systems that are provided relative to an inertial reference frame, such as the environment. A position of the imaging device and/or movable object can be determined in reference to a global coordinate system. In some instances, the position of the imaging device and/or movable object can be determined in reference to a local coordinate. The position of the imaging device and/or movable object may be converted between global and local coordinates.

Optionally, a target direction in an image may be determined in relation to a local coordinate system of the imaging device and/or the image captured by the imaging device. The local coordinates of the target direction can be converted to global coordinates for the target direction. For instance, a vector in a local coordinate system denoting the target direction can be converted to a vector in the global coordinate systems. The local coordinate system may be a camera coordinate system of the imaging device. The global coordinate system may be a world coordinate system of the environment within which the movable object moves.

A method for calculating/converting a user's selected point on a display screen to a target direction in a space within which the movable object moves is described as follows.

A position of a selected point on the image may be obtained when a user selects the point on the image. When the display screen is a touchscreen, the user may select the point by touching, tapping, or clicking a portion of the touchscreen. The position of the selected point on the image may be obtained by converting a set of screen coordinates of the selected point into a set of image coordinates, and normalizing the set of image coordinates. The target direction may be determined based on the normalized set of image coordinates.

For example, when a user selects a point within a graphical user interface (GUI) image displayed on the user terminal, coordinates ($x_{screen}$, $y_{screen}$) of the selected point corresponding to a screen position can be obtained. The coordinates ($x_{screen}$, $y_{screen}$) of the selected point can be obtained via an application programming interface (API). The API may be, for example an IOS™-based API or Android™-based API implemented on the user terminal. The coordinates ($x_{screen}$, $y_{screen}$) of the selected point can be converted into coordinates ($x_{rawimage}$, $y_{rawimage}$) which are the coordinates of the selected point in the raw image captured by the imaging device.

Next, the raw image coordinates ($x_{rawimage}$, $y_{rawimage}$) of the selected point can be normalized to ($x_{percentage}$, $y_{percentage}$), based on a position and a percentage of the current preview image within the raw image. The equations for the normalization may be given by:

$$\begin{cases} x_{percentage} = \dfrac{x_{rawimage}}{ImageWidth} \\ y_{percentage} = \dfrac{y_{rawimage}}{ImageHeight} \end{cases}$$

where ImageWidth and ImageHeight respectively correspond to a width and a height of the raw image frame. The above conversion and/or normalization can be performed by the user terminal using a combination of software and/or hardware.

Next, the normalized coordinates ($x_{percentage}$, $y_{percentage}$) of the user selected point 220 may be transmitted from the user terminal to the direction analyzer via one or more communication channels. The direction analyzer can be configured to calculate a spatial target direction ($x_{space}$, $y_{space}$, $z_{space}$) based on the normalized coordinates ($x_{percentage}$, $y_{percentage}$). The direction analyzer can be further configured to transmit the target direction ($x_{space}$, $y_{space}$, $z_{space}$) to the user terminal and the motion controller. The target direction may be converted into 2-D display coordinates ($x_{dir}$, $y_{dir}$), which are then projected and displayed onto the image rendered on the user terminal. The motion controller can be configured to control movement of the movable object based on the target direction ($x_{space}$, $y_{space}$, $z_{space}$).

The calculation of the spatial target direction ($x_{space}$, $y_{space}$, $z_{space}$) based on the user selected point is described in detail with reference to FIG. 3, which shows a geometry model of camera imaging. The geometry model may assume that an optical axis of the camera aligns with a center of the captured image, although the disclosure is not limited thereto. In some other geometry models, the optical axis need not be aligned with the center of the captured image, and can be offset from the center of the image.

Figure 3:
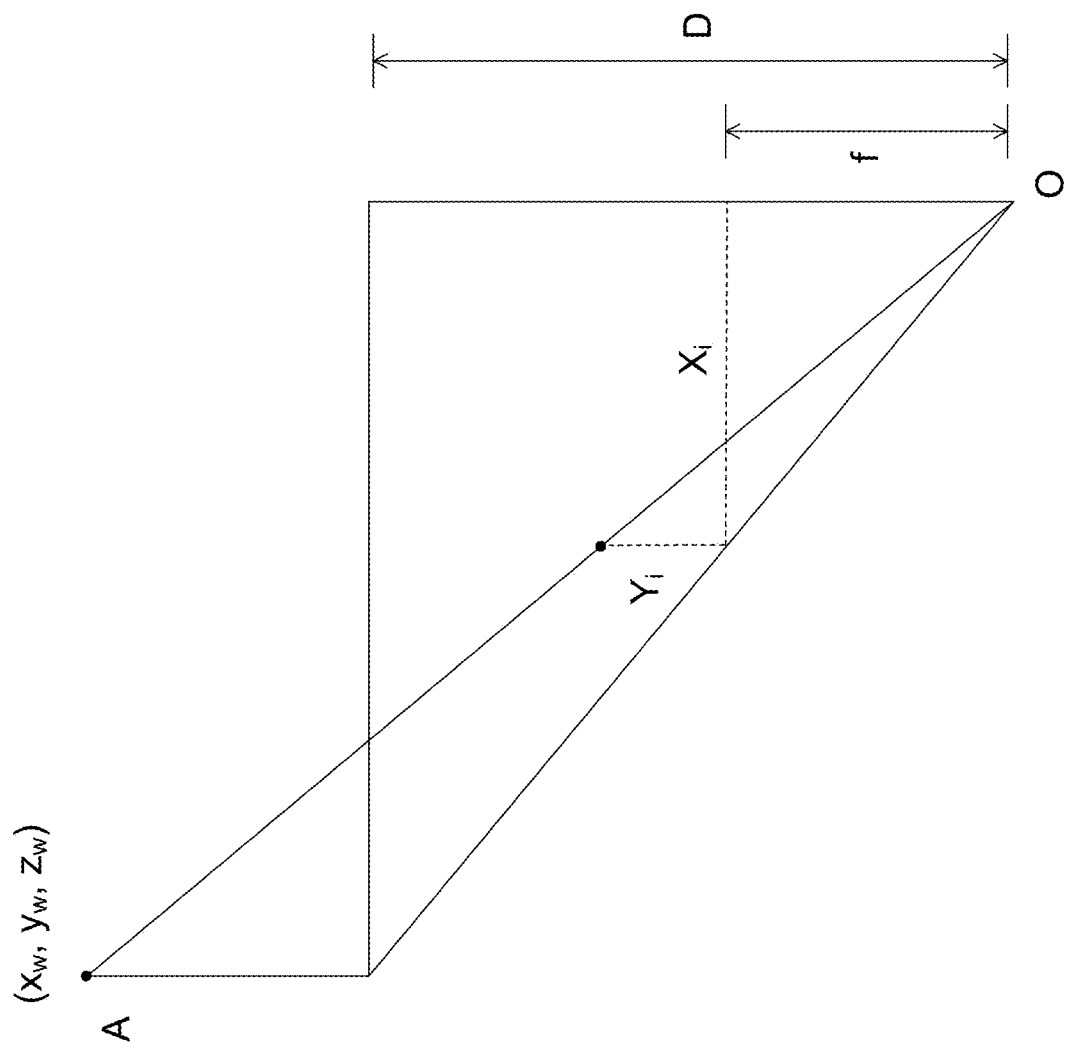
FIG. 3 shows a geometry model of camera imaging that can be used to determine a spatial target direction based on a user selected point, in accordance with some embodiments.

As shown in FIG. 3, the point ($x_w$, $y_w$, $z_w$) is an arbitrary point in a world coordinate system defined with respect to a point O, D is a depth of the point in the world coordinate system, and $z_w$=D. ($x_i$, $y_i$) are the corresponding coordinates of the same point ($x_w$, $y_w$, $z_w$) in a camera coordinate system. The following relations may be obtained:

$$\begin{cases} \dfrac{x_w}{z_w} = \dfrac{x_i}{f} \\ \dfrac{y_w}{z_w} = \dfrac{y_i}{f} \end{cases}$$

The following equation is based on a relation between ($x_{percentage}$, $y_{percentage}$), $x_i$, $y_i$, and (ImageWidth, ImageHeight) of the image:

$$\begin{cases} x_i = (x_{percentage} - 1/2) * ImageWidth \\ y_i = \left(\dfrac{1}{2} - y_{percentage}\right) * ImageHeight \end{cases}$$

Based on the following relation between a focal range f and field-of-view (FOV) of the image $$\begin{cases} f = \dfrac{ImageWidth}{2\tan(FOV_h/2)} \\ f = \dfrac{ImageHeight}{2\tan(FOV_v/2)} \end{cases}$$

the following equations may be obtained:

$$\begin{cases} \dfrac{x_i}{f} = \dfrac{\left(x_{percentage} - \dfrac{1}{2}\right) * ImageWidth}{\dfrac{ImageWidth}{2\tan\left(\dfrac{FOV_h}{2}\right)}} = (2 * x_{percentage} - 1) * \tan\left(\dfrac{FOV_h}{2}\right) \\ \dfrac{y_i}{f} = \dfrac{\left(\dfrac{1}{2} - y_{percentage}\right) * ImageHeight}{\dfrac{ImageHeight}{2\tan\left(\dfrac{FOV_v}{2}\right)}} = (1 - 2 * y_{percentage}) * \tan\left(\dfrac{FOV_v}{2}\right) \end{cases}$$

that is, $$\begin{cases} x_w = (2 * x_{percentage} - 1) * \tan\left(\dfrac{FOV_h}{2}\right) * D \\ y_w = (1 - 2 * y_{percentage}) * \tan\left(\dfrac{FOV_v}{2}\right) * D \\ z_w = D \end{cases}$$

As shown above, the coordinates ($x_w$, $y_w$, $z_w$) contains an unknown value D. A normalization step can be performed to eliminate the unknown value D since the selected direction is a direction vector. Assuming D=1, the direction vector OA of the selected direction in camera coordinate system may be given by:

$$\vec{OA} = (x_{space}, y_{space}, z_{space}) = \begin{pmatrix} \dfrac{x_w}{norm(x_w, y_w, z_w)} \\ \dfrac{y_w}{norm(x_w, y_w, z_w)} \\ \dfrac{z_w}{norm(x_w, y_w, z_w)} \end{pmatrix}$$

Using the model of FIG. 3, the vector OA of the target direction in the camera coordinate system can be obtained based on a point ($x_w$, $y_w$, $z_w$) in a world coordinate system. The point ($x_w$, $y_w$, $z_w$) in the world coordinate system may be associated with the selected point ($x_i$, $y_i$) in the camera coordinate system. The point ($x_w$, $y_w$, $z_w$) in the world coordinate system may comprise a depth value D. The vector OA of the target direction in the camera coordinate system can be obtained by normalizing ($x_w$, $y_w$, $z_w$) with respect to the depth value D, and the depth value D can be eliminated from the vector OA after the normalization.

Next, the vector OA of the target direction in the camera coordinate system can be converted into a vector $OA_{gnd}$ of the target direction in the world coordinate system using a translation matrix. For example, a translation matrix from the movable object to the world coordinate system (East, North, Ground) can be provided by a gimbal as:

$$M(\alpha, \beta, \gamma) = \begin{bmatrix} \cos(\alpha)\cos(\gamma) - \sin(\alpha)\cos(\beta)\sin(\gamma) & -\sin(\alpha)\cos(\beta)\cos(\gamma) - \cos(\alpha)\sin(\gamma) & \sin(\alpha)\sin(\beta) \\ \sin(\alpha)\cos(\gamma) - \cos(\alpha)\cos(\beta)\sin(\gamma) & \cos(\alpha)\cos(\gamma)\cos(\gamma) - \sin(\alpha)\sin(\gamma) & -\cos(\alpha)\sin(\beta) \\ \sin(\beta)\sin(\gamma) & \cos(\beta)\cos(\gamma) & \cos(\beta) \end{bmatrix}$$

The spatial direction vector $OA_{gnd}$ of the selected direction in world coordinate system (East, North, Ground) may be given as:

$$\vec{OA}_{gnd} = M * \vec{OA}$$

In some embodiments, the translation matrix can be obtained by using data collected from one or more sensors on the movable object. The one or more sensors may be located on an IMU of the movable object. The one or more sensors may be configured to measure an attitude of the movable object. The translation matrix can be obtained using in part the attitude of the movable object.

The direction analyzer may be configured to transmit the calculated target direction back to the user terminal. The user terminal may be configured to re-project the target direction as a graphical element onto the image in the computer-implemented display. The process of re-projecting the direction vector OA onto the preview image is a reverse of the method described in FIG. 3.

Figure 4:
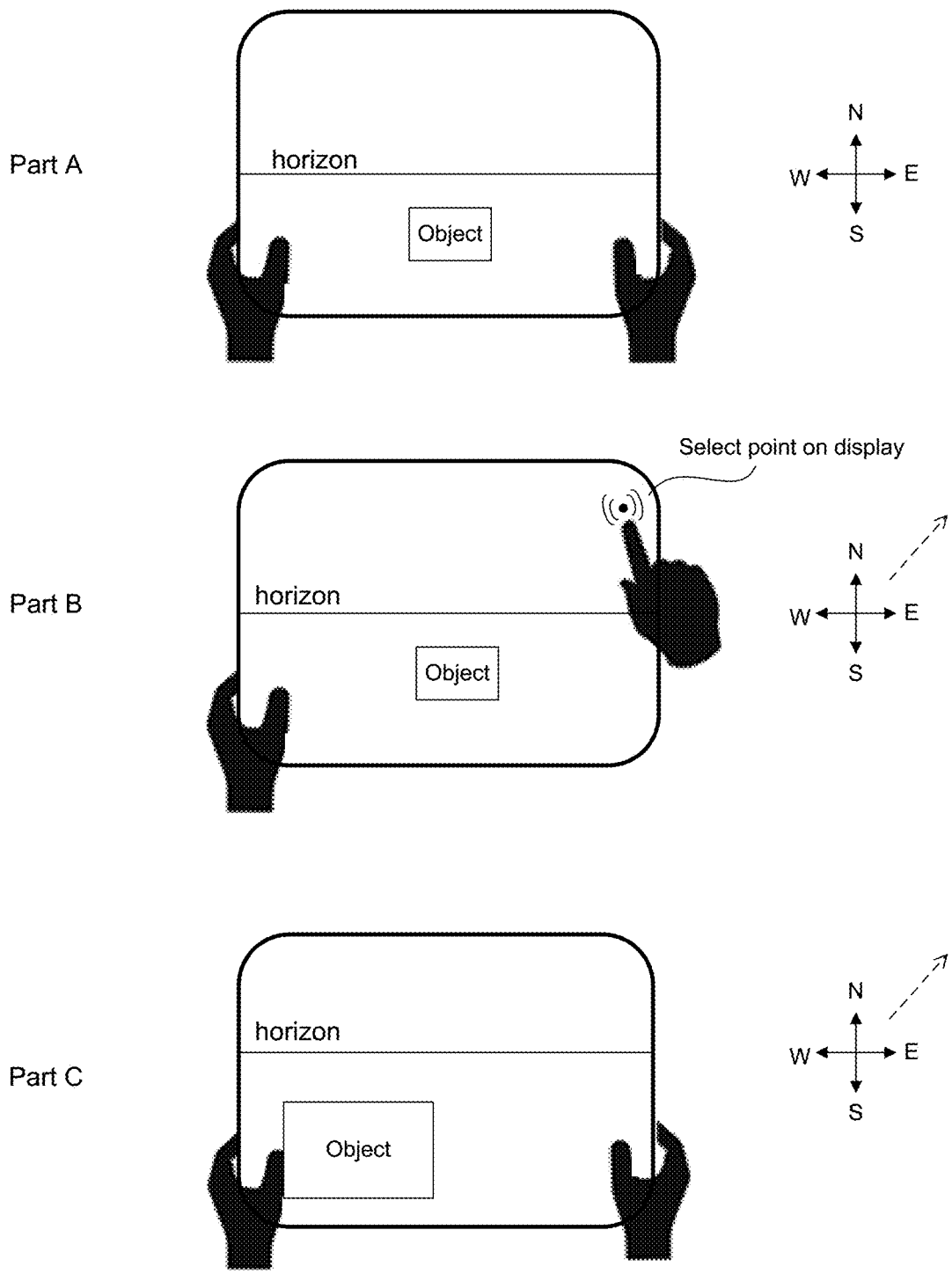
FIG. 4 shows an example of a user interface (UI) through which a user can select a target direction, in accordance with some embodiments.

FIG. 4 shows an example of a user interface (UI) through which a user can select a target direction, in accordance with some embodiments. Part A shows an initial display of an environment. Part B shows a user selecting a target direction within the initial display. Part C shows an image of the movable object traveling in the target direction. The movable object may be a UAV. Corresponding movements/headings of the UAV are shown in the compasses.

Part A shows an initial display of an environment. A FPV may be provided as illustrated. The FPV may include a live streaming image from an imaging device. The FPV may alternatively be a graphical depiction or representation of the image from the imaging device. In the example presented, a horizon is shown, along with an object within the field of view. The UAV may be stationary or moving while the initial display of the environment is occurring. For example, the corresponding compass shows a stationary UAV.

While a FPV is illustrated, other types of views may be presented in alternative or in conjunction with the FPV. For instance, a map view may be provided. The map view may include a 2D map, such as an overhead map. The map view may include a 3D map. The 3D map may be alterable to view the 3D environment from various angles. Solid renderings, wireframes, or other types of imaging may be shown, as described previously herein. The display may be shown on a user terminal. A user may optionally hold the user terminal.

Part B shows a user selecting a target direction within the initial display. The user may select a portion of the image to select the target direction. As previously described, the image may include a FPV and/or a map. The user may select a portion of the FPV or the map to select the target direction. The portion of the image selected by the user may optionally be a point. The UAV may travel in the direction indicated by the selected point. A directional heading of the UAV may be determined by a current location of the UAV and an angle that includes the selected point along the trajectory.

In the example presented, the user may select a target direction that is northeast of the current position of the UAV. The corresponding compass shows the UAV may move in a corresponding northeastern direction.

The user selection of a target direction may include a lateral selection of the target direction. In some instances, the target direction may be within a two-dimensional plane. For instance, the user may specify whether the UAV is to move north, south, east, west, or anywhere in between. The UAV may remain at substantially the same altitude while traveling in the specified two-dimensional direction.

In some embodiments, the UAV may encounter flight restrictions that may affect the flight path of the UAV. For instance, some lateral flight restrictions may apply. In one example, the UAV may remain within a certain range of the user terminal. If the UAV is traveling in a target direction, and is about to exceed the range of the user terminal, the UAV may stop and hover, or may return toward the user terminal. In another example, the UAV may remain within a geo-fenced region. If the UAV is traveling in a target direction, and is about to pass outside of the geo-fenced region, the UAV may stop hover, or may return toward the user terminal. An obstacle may be a flight restricted area. Alternatively a flight restricted area may or may not contain any obstacle. Any other type of flight restriction may apply.

Alternatively, the user selection of a target direction may include a three-dimensional selection of the target direction. The target direction may be anywhere within a three-dimensional space. For instance, the user may specify whether the UAV is to move north, south, east, west, up, or down, or anywhere in between. The UAV may be capable of changing altitude while traveling within the specified three-dimensional direction.

In some embodiments, the UAV may encounter flight restrictions that may affect the flight path of the UAV. Lateral flight restrictions, such as those previously described, may be provided. Additional altitude flight restrictions may be provided that may limit altitude change of the UAV. For instance, if the target direction is upwards, the UAV may travel in that target direction indefinitely, all the while increasing the altitude of the UAV. Alternatively, the flight restriction, such as a flight ceiling, may kick in. When the UAV reaches the flight ceiling, the UAV may level out and remain at substantially the same altitude. However, the UAV may continue to travel in the same specified lateral direction. Similarly, if the target direction is downwards, the UAV may travel in that direction indefinitely until it reaches the ground, all the while decreasing the altitude. Alternatively, the flight restriction, such as a flight floor, may kick in. When the UAV reaches the flight floor, the UAV may level out and remain at substantially the same altitude. However, the UAV may continue to travel in the same specified lateral direction.

In some embodiments, visual indicators (such as compass and/or vector) of the selected target may optionally be displayed. Additionally, heading information indicative of flight angles, compass direction, future/target destination, etc. may optionally be displayed on a 2D map and/or a 3D map.

The precision to which the user may specify a direction may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

When a user selects a portion of the image to specify a target direction, the selected target direction may or may not be visually indicated on the screen. For instance, a visual marker may be provided within the image indicative of the target direction. The visual marker may be a point, region, icon, line, or vector. For instance, the point may be indicative of a selection of the target direction. In another example, the vector may be indicative of the direction that the UAV is heading.

In some embodiments, a user may specify that the UAV is in a directional mode. When the UAV is in a directional mode, the portion of the image selected by the user may determine the direction at which the UAV will travel until it encounters other directions, or encounters flight restrictions.

The UAV may travel indefinitely in that direction until it encounters a stop or change criteria, such as a direction change, flight restriction, flight mode change, low power supply or obstacle. The user may specify that the UAV is in a directional mode by selecting the directional mode from one or more available modes, such as a target tracking mode.

In another example, the UAV may fly in a target direction when a user selects a user-interface tool that indicates that the portion of the image that the user will select will be the target direction. The target direction tool may be a one-use tool (e.g., the user may need to reselect the tool in order to select another target direction), or may be used multiple times (the user can keep specifying target direction without having to re-select the tool unless the user has switched tools).

In other examples, one or more images (e.g., FPV, 2D map and/or 3D map) on the screen may have one or more predetermined regions indicative of flight direction. The regions may be visually distinguishable from other regions. For instance, the regions may include borders, or arrows, or any other type of features that may distinguish the region. In some instances the regions may be provided in a border surrounding the image. In other instances, one or more arrow buttons may be provided that may allow the target direction of the UAV to be adjusted. In additional examples, a user may indicate one or more values or coordinates indicative of the target direction that the UAV is to travel. For instance, angles may provide a target direction for the UAV to head. The angles may be provided for two dimensional or three dimensional direction control. In another example, the values may include spatial coordinates which are along a vector descriptive of the target direction.

Any other user interface tools or techniques may be provided that allow a user to specify a target direction using the user interface.

Part C shows an image captured by the UAV when it is traveling in the target direction. For instance, from a FPV, when a UAV is traveling in the specified direction, an object that was once further away may become closer up. From a map view, objects may be shown to be passed by the UAV as the UAV follows the target direction. As shown on the corresponding compass, the UAV may be continuing to travel in the target direction.

In some instances, when a user specifies a target direction, the UAV may travel in that target direction at a fixed velocity or a variable velocity. A standard target travel velocity may be provided. A variable target travel velocity may also be provided. Alternatively, the user may specify the velocity and/or acceleration at which the UAV may be traveling in the target direction. Any description herein of affecting the velocity of the UAV may also apply to affecting acceleration of the UAV in the target direction. In some instances, the user may affect the velocity at the same time at which the user is specifying the target direction. For instance, when a user selects a target direction, the number of clicks or touches that a user touches the target direction may affect the velocity of the UAV. For instance, if a user touches a point indicative of a target direction a single time, the UAV may travel at a first velocity, and if the user touches the point multiple times, the UAV may travel a second velocity. The second velocity may be greater than the first velocity. The velocity of the UAV travel may correspond to the number of touches or selections of the point indicative of the target direction. A positive proportional relationship may be provided between the number of selections and the velocity of the UAV. In some instances, a linear relationship may be provided between the number of selections and the velocity of the UAV. For instance, if a user clicks on the point N times, the velocity of the UAV may be $X+N*Y$, where X is a velocity value, Y is a velocity multiplier, and N is the number of times the target direction was selected. Any other mathematical relation may be provided. The user may make a selection a first time to get a first velocity, and then make the selection again to speed up the UAV. The user may keep making the selection to keep speeding up the UAV.

In another example, when a user selects a target direction, the length of the selection of the target direction may affect the velocity of the UAV. For instance, if a user touches a point indicative of a target direction for a first period of time, the UAV may travel at a first velocity, and if the user touches a second period of time greater than the first period of time, the UAV may travel a second velocity. The second velocity may be greater than the first velocity. The velocity of the UAV travel may correspond to the length of the touch or selection of the point indicative of the target direction. A positive proportional relationship may be provided between the length of the selection and the velocity of the UAV. In some instances, a linear relationship may be provided between the length of the selection and the velocity of the UAV.

Various other types of user interactions may affect the velocity of the UAV traveling in the target direction. In some examples, swiping motions (e.g., speed of swipe, length of swipes, number of swipes) may affect the velocity of the UAV. In other examples, different regions may be touched to affect the velocity of the UAV. In another example, a separate control may be provided for velocity control. For instance, a user may adjust a velocity using a manual control while the UAV is traveling in the target direction. The velocity may be adjusted in accordance with the manual control in real-time. In another example, a user may enter a numerical value for the desired velocity, or select the velocity from a plurality of pre-selected options.

Figure 5:
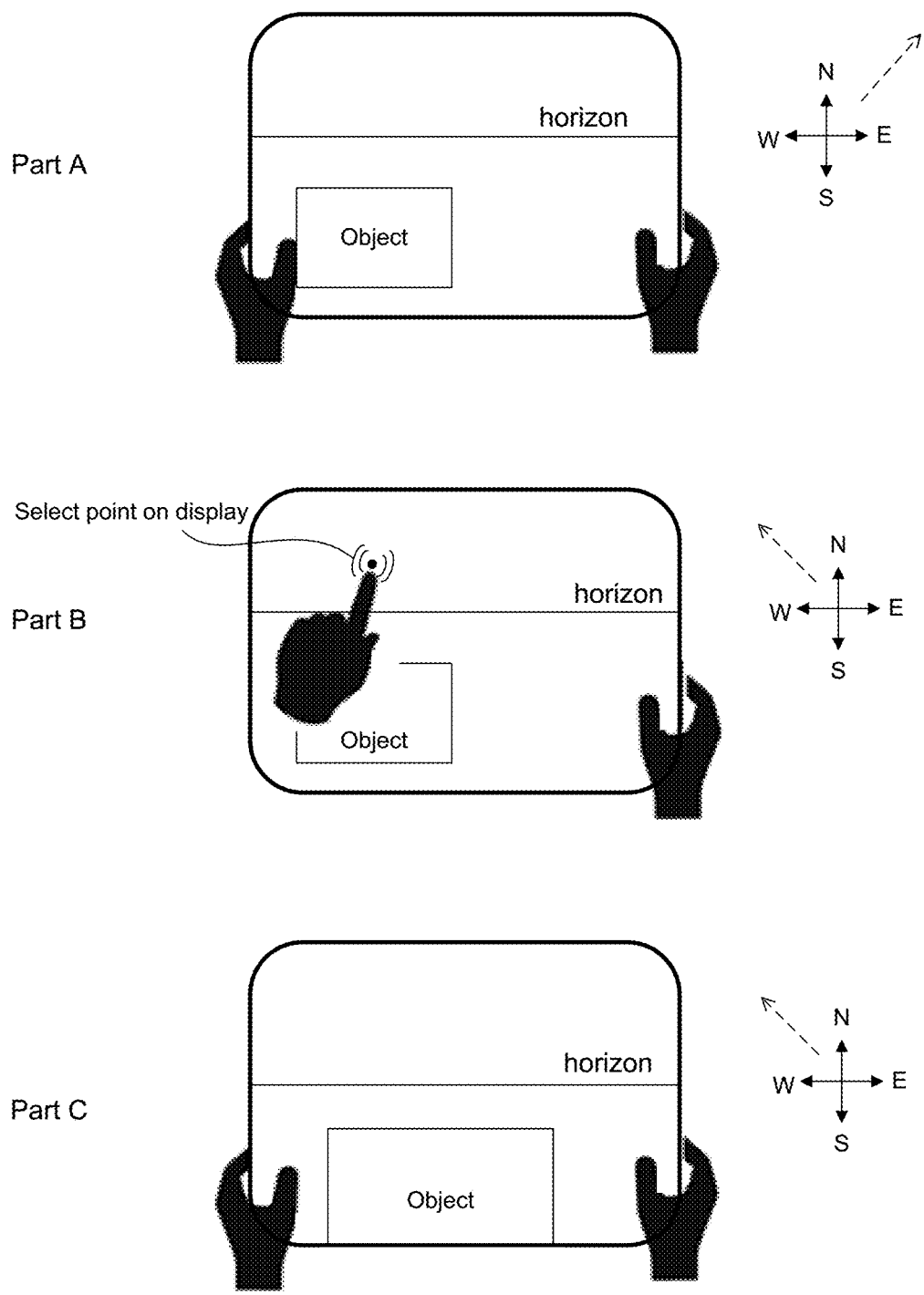
FIG. 5 shows an example of a user interface (UI) through which a user can adjust a target direction, in accordance with some embodiments.

FIG. 5 shows an example of a user interface (UI) through which a user can adjust a target direction, in accordance with some embodiments. Part A shows a display of an environment while a UAV is heading in a first target direction. Part B shows a user selecting a second target direction different from the first target direction within the display. Part C shows an image captured by the UAV when it is traveling in the second target direction. As previously described, the image is illustrated as a FPV, but may also be a map in conjunction with or as an alternative to the FPV. Corresponding movements/headings of the UAV are shown in the compasses.

Part A shows a display of an environment while a UAV is heading in a first target direction. The corresponding compass shows that the UAV is traveling in a northeast direction. When a target direction is selected, the UAV may continue along that target direction until it encounters a situation that requires a change in direction, such as those previously described (e.g., a direction change, flight restriction, flight mode change, low power supply or obstacle). The UAV may continue in the target direction along a constant velocity and/or acceleration or a varying velocity and/or acceleration.

Part B shows a user selecting a second target direction different from the first target direction within the display. For instance, the second target direction may be in a northwest direction. The second target direction may be selected in the same manner as the first target direction. The second target direction may be selected while the UAV is traversing the first target direction. The corresponding compass shows that the UAV is now traveling in the northwest direction.

Part C shows an image of the movable object traveling in the second target direction. The UAV may transition from the traveling in the first target direction to traveling in the second target direction. The transition from the first to second target direction may be relatively abrupt or gradual.

Figure 6:
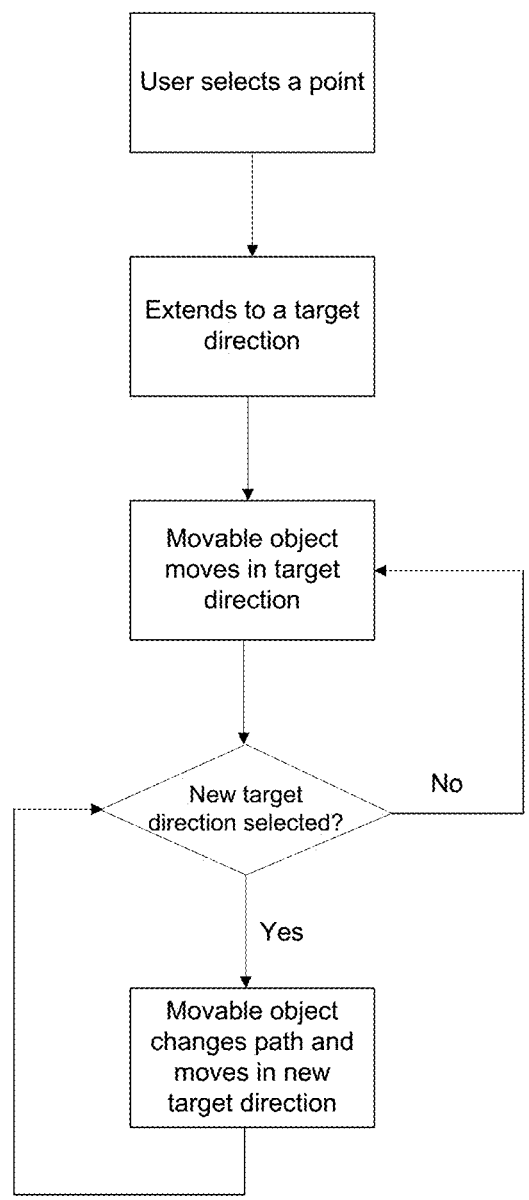
FIG. 6 illustrates a flowchart for controlling a direction of a movable object, in accordance with some embodiments.

FIG. 6 illustrates a flowchart for controlling a direction of a movable object, in accordance with some embodiments. First, a user may select a point on an image. The image may be provided in a GUI rendered on an output device of a user terminal. When the user selects the point, the selection may extend to a target direction associated with that point. The movable object may then move in the target direction. The movable object may continue to move in the target direction until a countermanding condition is detected. For instance, the movable object may fly in the target direction until a new target direction instruction is received at the user terminal. A new target direction instruction may be received when the user selects another different point on the image. When the user selects a different point, the target direction selection may switch from the original movable object direction to the new target direction that is associated with the new point. The movable object may then change its motion path and move in the new target direction.

Figure 7:
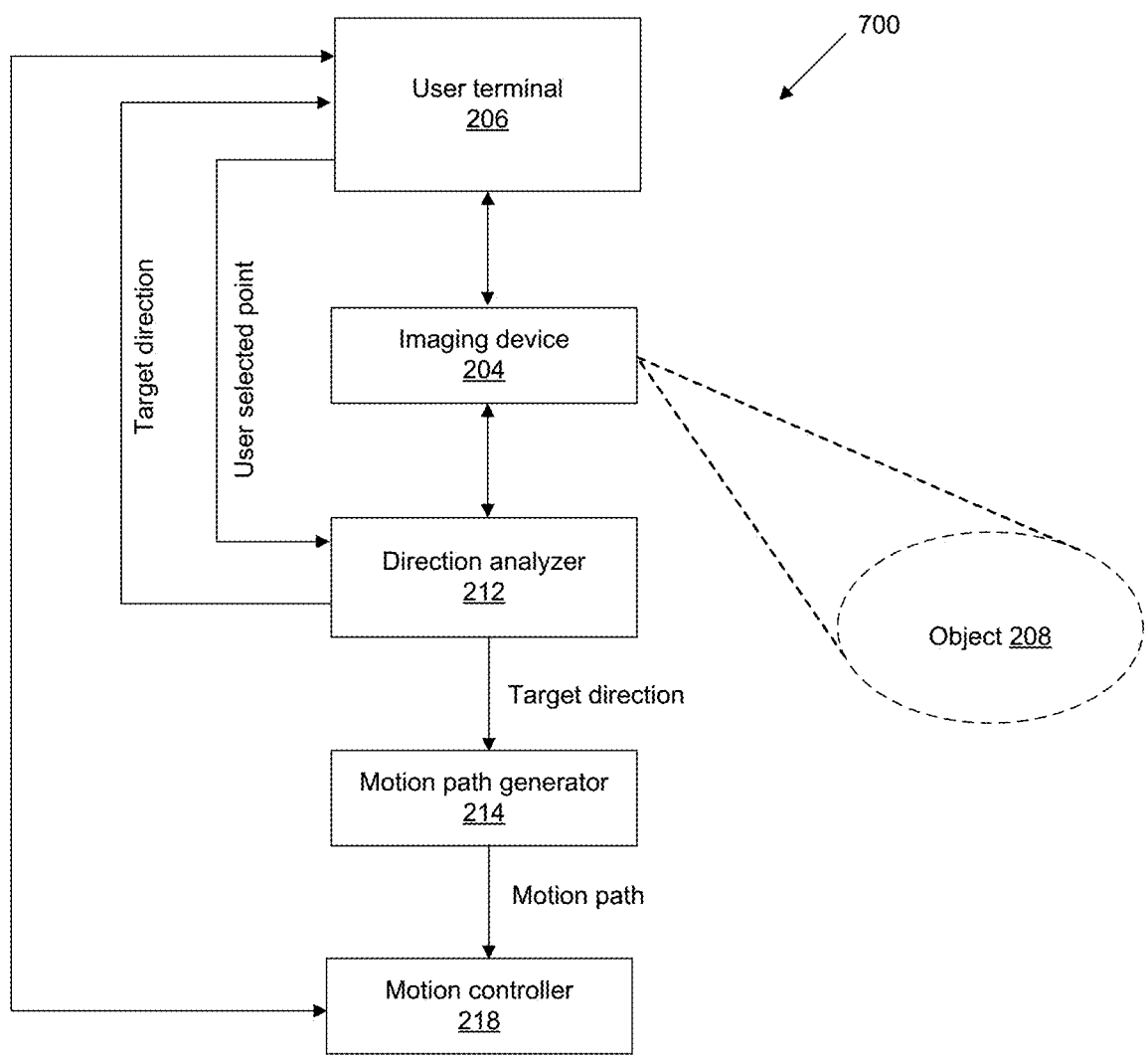
FIG. 7 shows an example of communications that can occur within a visual interactive navigation system, in accordance with some other embodiments.

FIG. 7 shows an example of communications that can occur within a visual interactive navigation system, in accordance with some embodiments. Visual navigation system 700 in FIG. 7 may be similar to system 200 in FIG. 2, except system 700 further includes a motion path generator 214. The motion path generator can be configured to generate a motion path for a movable object to arrive at a reference point before heading in a target direction. The motion path may be needed in some instances, for example, (1) when a user selects a target direction that is different from an existing direction of travel of the movable object; (2) when a current or initial position of the movable object does not lie along a vector in the target direction; (3) when the movable object is stationary, hovering, or at rest; and/or (4) when a head portion of the movable object is not oriented towards the target direction.

Figure 8:
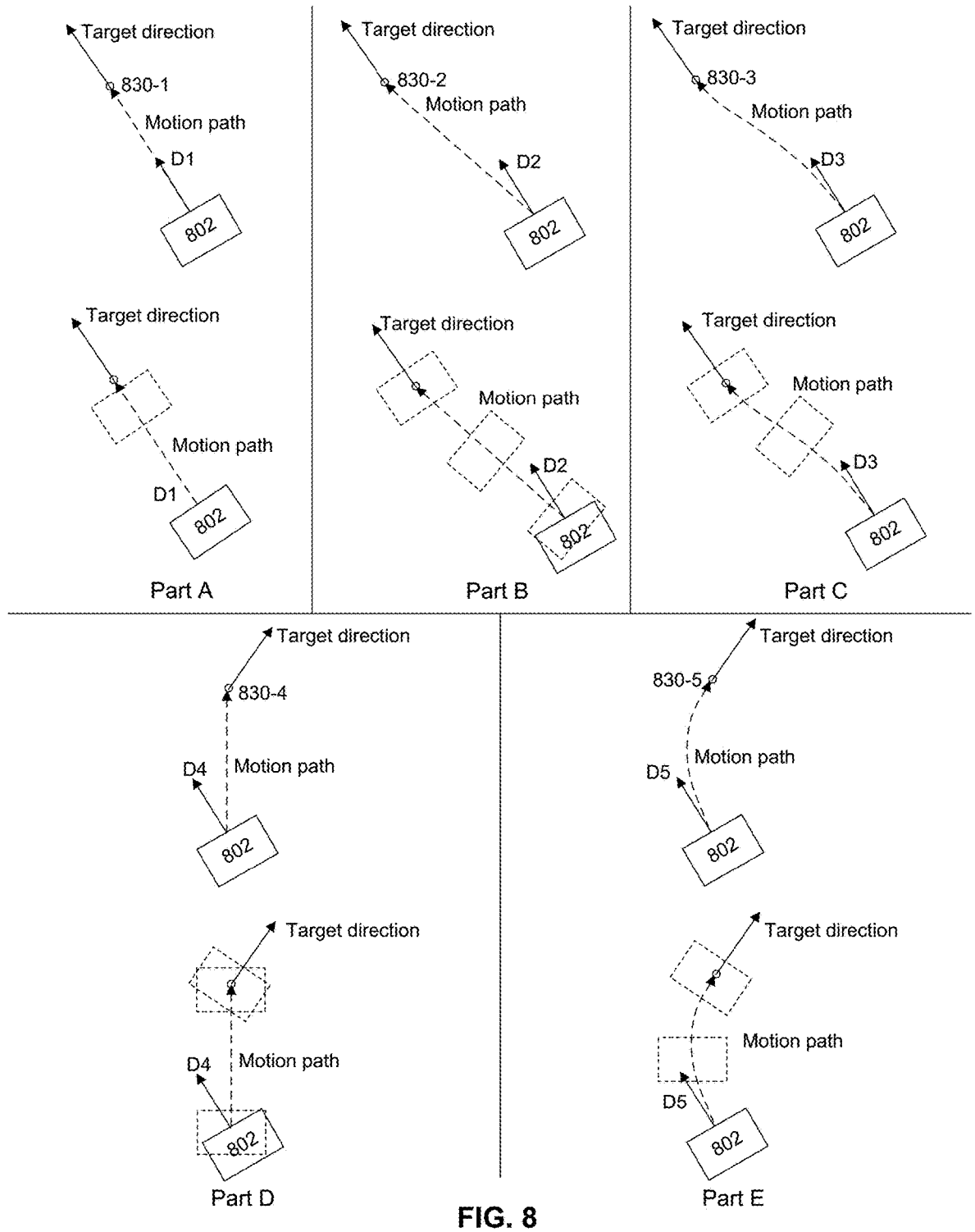
FIG. 8 shows examples of different motion paths that a movable object can take when moving towards a reference point associated with a target direction, in accordance with some embodiments.

Some examples of motion paths that can be generated by the motion path generator are shown in FIG. 8. Specifically, FIG. 8 shows examples of different motion paths that a movable object can take when moving towards a reference point associated with a target direction.

In each of parts A, B, C, D, and E, a reference point 830 may be associated with a target direction. The reference point may correspond to a start position for a movable object 802 to move in the target direction. The reference point may be a point along a spatial vector defined by the target direction. A motion path may be generated from the current or initial position of the movable object to the reference point. The motion paths may be linear, curved, or curvilinear.

In part A, the movable object may be moving in a direction D1 that is aligned with the target direction. In other words, the direction D1 is the same as the target direction. A straight motion path may be generated from the current position of the movable object to the reference point 830-1. The orientation (e.g., heading) of the movable object may remain unchanged as it moves along the motion path to the reference point 830-1 in the target direction.

In part B, the movable object may be moving in a direction D2 that is substantially parallel to the target direction. A straight motion path may be generated from the current position of the movable object to the reference point 830-2. The orientation (e.g., heading) of the movable object may change as it moves along the motion path to the reference point 830-2. For example, the movable object may first rotate to a new orientation such that it is headed in the direction of the motion path. The movable object may then move along the motion path with the new orientation. When the movable object reaches the reference point, it may rotate again such that the head portion of the movable object faces the target direction, before moving in the target direction.

Part C is similar to part B except for the following difference. In part C, a curvilinear motion path can be generated from the current position of the movable object to the reference point 830-3. The orientation of the movable object may be continuously changing as the movable object moves along the motion path. The movable object may move in a substantially tangential manner along the motion path.

In part D, the movable object may be moving in a direction D4 that is different from the target direction. For example, the direction D4 may be oblique to the target direction. A straight motion path can be generated from the current position of the movable object to the reference point 830-4. The orientation (e.g., heading) of the movable object may change as it moves along the motion path to the reference point 830-4. For example, the movable object may first rotate to a new orientation such that it is headed in the direction of the motion path. The movable object may then move along the motion path with the new orientation. When the movable object reaches the reference point, it may rotate again such that the head portion of the movable object faces the target direction, before moving in the target direction.

Part E is similar to part D except for the following difference. In part E, a curvilinear motion path can be generated from the current position of the movable object to the reference point 830-5. The orientation of the movable object may be continuously changing as the movable object moves along the motion path. The movable object may move in a substantially tangential manner along the motion path.

In parts B and D, the movable object may experience abrupt changes in orientation due to the linear motion path connecting the current position to the reference point, and differences in the target direction and the existing direction of travel, which generate sharp junctures at the current position and the reference point. These abrupt changes in orientation can result in sudden deceleration or acceleration, and reduce the flight performance of the movable object.

In contrast, the curvilinear motion paths in parts C and E can enable the movable object to transition smoothly from its current position to the reference point before commencing travel in the target direction. By effecting movement of the movable object along the smooth curvilinear motion paths, sudden changes in orientation of the movable object can be avoided, thereby improving the flight performance of the movable object. For example, switching course in a curvilinear manner may provide certain benefits, such as reduction in power consumption of the movable object and/or improvement in flight stability of the movable object.

Figure 9:
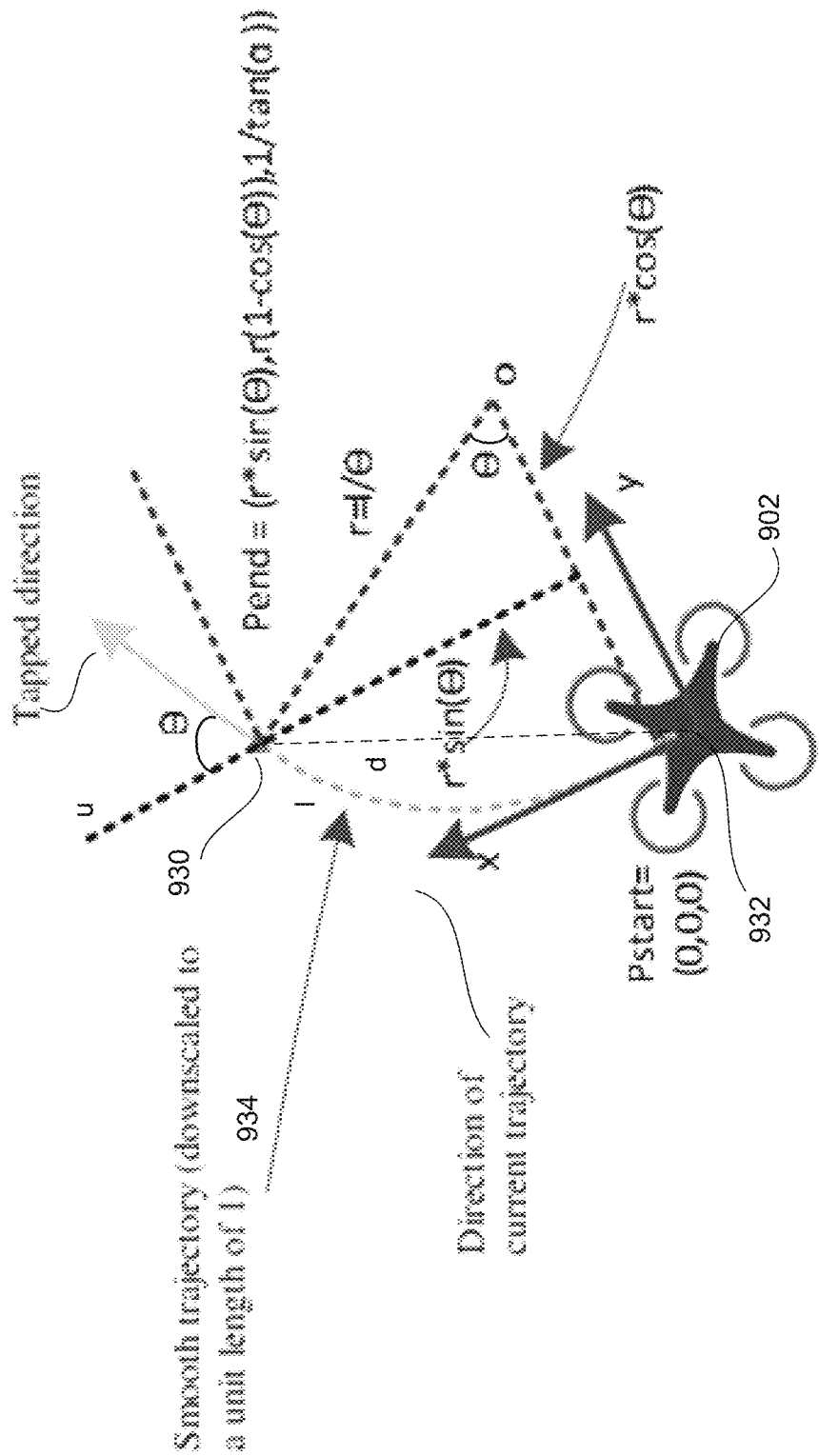
FIG. 9 shows a motion path that is generated from a position of the movable object to a reference point associated with a target direction, in accordance with some embodiments.

Next, the generation of motion paths (specifically, the curvilinear motion paths in parts C and E of FIG. 8) is described with reference to FIG. 9. FIG. 9 shows a motion path that is generated from a position of the movable object to a reference point associated with a target direction, in accordance with some embodiments.

Referring to FIGS. 7 and 9, the motion path generator can be configured to estimate a reference point 930 for a movable object 902, and one or more motion characteristics of the movable object at the reference point based on a target direction. The target direction may correspond to a "tapped"

direction on an image (e.g., an FPV) displayed on the user terminal. The target direction may be determined from a user input to the user terminal using the direction analyzer described elsewhere herein. The motion path generator may be configured to generate a motion path 934 for the movable object from a position 932 of the movable object to the reference point, based on one or more motion characteristics of the movable object at the position and the reference point.

The reference point 930 may correspond to a start position from which the movable object begins moving in the target direction. The position 932 of the movable object may correspond to an initial position or a current position of the movable object. In some cases, the position 932 and the reference point 930 may be at different altitudes. In other cases, the position 932 and the reference point 930 may be at a same altitude.

As shown in FIG. 9, when the movable object is at the position 932, the movable object may be heading in an initial direction that is different from the target direction. The initial direction may be along an x-axis passing through the center of the movable object. The initial direction may be oblique to the target direction, similar to the example shown in part E of FIG. 8. The initial direction may be defined by a first tangent to the motion path at the position 932 of the movable object. The target direction may be defined by a second tangent to the motion path at the reference point 930. The first tangent and the second tangent may extend in different directions. The first tangent and the second tangent may be non-parallel. For example, the first tangent and the second tangent may be oblique to each other, as shown in FIG. 9. In some cases, the first tangent and the second tangent may be parallel to each other (for example, as shown in part C of FIG. 8). In some other cases, the first tangent and the second tangent can be orthogonal to each other.

The motion path 934 may be curvilinear. For example, the motion path between the position 932 and the reference point 930 may form an arc having a radius r and subtending an angle θ at a point O. The point O may lie in a direction that is orthogonal to the initial direction of the movable object. For example, the point O may lie along a y-axis passing through the center of the movable object. The angle θ may be a constant. Optionally, the angle θ may be variable. The radius r may vary with a distance d between the position 930 and the reference point 932. The distance d may be given by a length of a straight line joining the position 930 and the reference point 932. The radius r may increase when the distance between the position and the reference point increases. Conversely, the radius r may decrease when the distance between the position and the reference point decreases. A length l of the motion path 934 may vary with the radius r. The length l may correspond to an arc length of the motion path. The length l of the motion path may increase when the radius r increases. Conversely, the length l of the motion path may decrease when the radius r decreases. The target direction may form the angle θ with a line u passing through the reference point. The line u may be parallel to the first tangent (i.e., parallel to the initial direction). The radius r may be given by l/θ.

In FIG. 9, an orientation of the movable object at the reference point 930 may be different from an orientation of the movable object at the position 932. For example, a head portion of the movable object may be facing the initial direction at the position 932, and facing the target direction at the reference point 930. Optionally, in some embodiments, the movable object may be in a same orientation at both the position 932 and the reference point 930.

The movable object may be at the position 932 having one or more motion characteristics at a first time instance. The motion characteristics may comprise a first velocity and/or a first acceleration of the movable object at the position 932. The position 932, the first velocity, and the first acceleration of the movable object may be obtained using one or more sensors on the movable object. The one or more sensors may be provided in an inertial measurement unit (IMU) on the movable object. The IMU may be an electronic device that is configured to measure and report the movable object's velocity, orientation, and gravitational forces, using a combination of accelerometers and gyroscopes. Magnetometers may be optionally included. The IMU may detect current rate of acceleration using one or more accelerometers, and detect changes in rotational attributes like pitch, roll and yaw using one or more gyroscopes. A magnetometer may be included to assist calibration against orientation drift.

The movable object may be estimated to be at the reference point 930 having one or more motion characteristics at a second time instance. The second time instance may be a point in time occurring after the first time instance. The motion characteristics of the movable object at the reference point may comprise a second velocity and/or a second acceleration of the movable object at the reference point. The reference point, the second velocity, and the second acceleration may be obtained from a user input. The user input may be provided via a computer-implemented interface on the user terminal. The reference point, the second velocity, and the second acceleration may respectively correspond to a position, velocity, and acceleration of the movable object that the user desires at the second time instance. The reference point may lie along a spatial vector defining the target direction. As previously noted, the reference point may correspond to a start position from the movable object begins moving in the target direction. The target direction can also be obtained from the user input, as described elsewhere herein. The movable object may be predicted to reach the reference point 930 with the second velocity and second acceleration at the second time instance by following the motion path.

In some cases, the position 932 of the movable object in world coordinates may be initialized to (0, 0, 0) to simplify calculations. The reference point 930 of the movable object in world coordinates may be given by (r*sin(θ), r(1−cos(θ)), 1/tan(α)). Specifically, the x-coordinate of the reference point may be calculated as r*sin(θ); the y-coordinate of the reference point may be calculated as r(1−cos(θ)); and the z-coordinate of the reference point may be calculated as 1/tan(α). The angle θ may be given by θ=a tan($y_{space}/x_{space}$). The angle α0 may be given by:

$$\alpha = \operatorname{atan}\left(\frac{z_{space}}{\sqrt{x_{space}^2 + y_{space}^2}}\right)$$

The coordinates ($x_{space}$, $y_{space}$, $z_{space}$) may correspond to the direction vector OA of the user selected direction in camera coordinate system, as previously described with reference to FIG. 3.

In some cases, the length l of the motion path 934 may be normalized to a unit length of 1 to simplify calculations. Accordingly, the normalized x-coordinate of the reference point 930 may be given by sin(θ)/θ. The normalized y-coordinate of the reference point 930 may be given by (1−cos(θ))/θ. Each of the normalized x-coordinate and y-coordinate is then multiplied by a scale factor S to obtain the actual x-coordinate and y-coordinate of the reference point 930. The scale factor S may be determined based on $V_x$, $V_y$, and $V_z$, which are the tri-axis velocities of the movable object in a (North, East, Ground) coordinate system:

$$S=\sqrt{V_x^2+V_y^2+V_z^2}$$

The velocities $V_x$, $V_y$, and $V_z$ may be the tri-axis velocities of the movable object at the position 932.

The motion path can be represented by a function of the position 932, the reference point 930, and one or more motion characteristics of the movable object at the position 932 and the reference point 930. The function representing the motion path can be generated by the motion path generator described elsewhere herein. The motion path may be represented by one or more functions. The one or more functions may include polynomial functions, Bezier curves, B-splines, etc. A polynomial function can be of an n-th order, where n can be an integer greater than or equal to one. When n=1, the function is a straight line, and the movable object may be configured to move along a straight motion path (for example, as shown in part A of FIG. 8). When n>1, the polynomial function is a curved line, and the movable object may be configured to move along a curved motion path (for example, as shown in part E of FIG. 8, and FIG. 9).

The polynomial function may be provided as a function of time, and can be used to compute a displacement of the movable object at an instantaneous point in time. A spatial position of the movable object within an environment can be obtained from the displacement. The displacement may include a linear and/or angular displacement of the movable object within the environment. A first-order derivative of the time-based polynomial function can be used to compute a velocity of the movable object at an instantaneous point in time. The velocity may include a linear and/or angular velocity of the movable object within the environment. Similarly, a second-order derivative of the time-based polynomial function can be used to compute an acceleration of the movable object at an instantaneous point in time. The acceleration may include a linear and/or angular acceleration of the movable object within the environment. Accordingly, the polynomial time-based function and its derivatives can be used to determine a plurality of motion characteristics of the movable object for different time instances.

The motion path generator may be configured to determine one or more coefficients of a time-based polynomial function representing the motion path. The one or more coefficients may be determined based on the position 932, the reference point 930, and the one or more motion characteristics at the position 932 and the reference point 930. The one or more coefficients may be determined based in part on an inverse polynomial matrix. The values in the inverse polynomial matrix can be obtained from the polynomial time-based function and its derivatives. The one or more coefficients can be determined without using one or more intermediate waypoints between the position 932 and the reference point 930. Accordingly, the motion path 934 can be generated without using one or more intermediate waypoints between the position 930 and the reference point 934.

As previously described, the motion path can be represented by an n-th order polynomial function. When the movable object is moving with a constant velocity, the motion path can be represented by a low order (e.g., 1st order) polynomial time-based function, whereby the first derivative of the function denotes the velocity and is a constant. When the movable object is moving with a constant acceleration, the motion path can be represented by the next order (e.g., 2nd order) polynomial time-based function, whereby the second derivative of the function denotes the acceleration and is a constant. Lower order polynomial functions may be used to represent a motion path when there are no obstacles or relatively few obstacles in the motion path.

In some instances, the motion path may be represented by a higher order polynomial time-based function (for example, n>2). A higher order polynomial time-based function may be used when the movable object is desired to move in a complicated trajectory traversing various points with different velocities and accelerations, and/or (2) if there is a relatively high number of obstacles in the motion path. In the above instances, the motion path can be smoothed using a higher order time-based polynomial function, such as the 5th order time-based polynomial function shown below:

$$f(t)=a5*t^5+a4*t^4+a3*t^3+a2*t^2+a1*t^1+a0$$

where a0, a1, a2, a3, a4, and a5 are the coefficients for different degree terms of the polynomial function f(t). Although the above example shows a $5^{th}$ order time-based polynomial function, the disclosure is not limited thereto. In some cases, the polynomial function representing the motion path can be lower than $5^{th}$ order (e.g., $3^{rd}$ order or $4^{th}$ order). Alternatively, the polynomial function representing the motion path can be higher than $5^{th}$ order (e.g., $6^{th}$ order or $7^{th}$ order). The motion path may be represented by a polynomial function of any degree/order, although it should be noted that the amount of processing power needed to generate the function (or motion path) generally increases with the degree/order of the function.

The motion path generator may be configured to generate the function f(t). The function f(t) may define the motion path for the movable object between the position 932 and the reference point 930. The function f(t) may be generated based on the spatial target direction vector ($x_{space}$, $y_{space}$, $z_{space}$), and motion characteristics of the movable object at the position 932 and the reference point 930. The position 932 may correspond to a start point $P_{start}$ of the motion path. The reference point 930 may correspond to an end point $P_{end}$ of the motion path. The movable object may have a start velocity $V_{start}$ and a start acceleration $A_{start}$ at the start point $P_{start}$. The movable object may have an end velocity $V_{end}$ and an end acceleration $A_{end}$ at the end point $P_{end}$. The coordinates of the start point $P_{start}$ may be given by $P_{start}=(x_{start}, y_{start}, z_{start})$. The start velocity $V_{start}$ may include velocity components along different axes, such that $V_{start}=(vx_{start}, vy_{start}, vz_{start})$. The start acceleration $A_{start}$ may include acceleration components along different axes, such that $A_{start}=(ax_{start}, ay_{start}, az_{start})$. The coordinates of the end point $P_{end}$ may be given by $P_{end}=(x_{end}, y_{end}, z_{end})$. The end velocity $V_{end}$ may include velocity components along different axes, such that $V_{end}=(vx_{end}, vy_{end}, vz_{end})$. The end acceleration $A_{end}$ may include acceleration components along different axes, such that $A_{end}=(ax_{end}, ay_{end}, az_{end})$.

The position of the movable object at any point in the motion path may be given by the function f(t):

$$f(t)=a5*t^5+a4*t^4+a3*t^3+a2*t^2+a1*t^1+a0$$

The velocity of the movable object at any point in the motion path is given by the first derivative of the function f(t):

$$f'(t)=5*a5*t^4+4*a4*t^3+3*a3*t^2+2*a2*t^1+a1$$

The acceleration of the movable object at any point in the motion path is given by the second derivative of the function f(t):

$$f''(t)=20*a5*t^3+12*a4*t^2+6*a3*t^1+2*a2$$

When the movable object is at the start point $P_{start}$, the time t may be set or initialized to zero. Substituting t=0 into the above functions yields:

$$P_{start}=f(0)=a0$$

$$V_{start}=f'(0)=a1$$

$$A_{start}=f''(0)=2*a2$$

When the movable object is at the end point $P_{end}$, the functions may be given by:

$$P_{end}=f(t)$$

$$V_{end}=f'(t)$$

$$A_{end}=f''(t)$$

The above functions and coefficients can be rewritten in matrix form as F=M*A which is based on the assumption of unit time:

$$F = \begin{Bmatrix} P_{start} \\ V_{start} \\ a_{start} \\ P_{end} \\ V_{end} \\ a_{end} \end{Bmatrix} = \begin{pmatrix} 0 & 0 & 0 & 0 & 0 & 1 \\ 0 & 0 & 0 & 0 & 1 & 0 \\ 0 & 0 & 0 & 2 & 0 & 0 \\ 1 & 1 & 1 & 1 & 1 & 1 \\ 5 & 4 & 3 & 2 & 1 & 0 \\ 20 & 12 & 6 & 2 & 0 & 0 \end{pmatrix} * \begin{Bmatrix} a5 \\ a4 \\ a3 \\ a2 \\ a1 \\ a0 \end{Bmatrix} = M*A$$

A is a matrix containing the coefficients of the polynomial function f(t). The coefficients can be obtained from A=M⁻₁*F since all of the parameters can either be measured, are known, or are provided by a user. For example, the start point $P_{start}$, start velocity $V_{start}$, and start acceleration $A_{start}$ are known, and can be measured by one or more sensors (e.g., an IMU) when the movable object is at the start position. The end point $P_{end}$, end velocity $V_{end}$, and end acceleration $A_{end}$ may be obtained from a user input (e.g., provided through a user terminal). The end point may correspond to the reference point 930 lying in the target direction, and may be associated with a user selected point on a computer-implemented display. The end velocity and end acceleration may correspond to an input velocity and acceleration of the movable object (as provided or defined by the user) at the end point.

For the smoothening of the lines in each direction (X, Y, and Z), a number of n-order polynomials may be resolved to ensure that the location, velocity and acceleration are continuous at the start point and end point of the motion path, by taking into account the following known values: (1) the locations of the start point and end point, (2) the velocities at the start point and end point, and (3) the accelerations at the start point and end point. For example, in the X direction, the location, velocity, and acceleration at the start point are known values corresponding to $x_0$, $\bar{x}_0$, $\ddot{x}_0$ respectively at time t=0, and may be determined using one or more sensors (e.g., an IMU) on the movable object. The location, velocity, and acceleration at the end point are known values corresponding to $x_1$, $\bar{x}_1$, $\ddot{x}_1$ respectively at time t=T, and may be obtained from a user input through a user terminal. T is the time that the movable object takes to travel from the start point to the end point, and is an adjustable parameter. A smaller T results in a sharper curve in the motion path, and a larger T results in a more gradual curve. The following 5$^{th}$-order polynomial equation may be solved:

$$x(t)=a_5t^5+a_4t^4+a_3t^3+a_2t^2+a_1t+a_0$$

to obtain a time series of control points in the X direction. Likewise, the following 5$^{th}$-order polynomial equation may be solved:

$$y(t)=b_5t^5+b_4t^4+b_3t^3+b_2t^2+b_1t+b_0$$

to obtain a time series of control points in the Y direction. Similarly, the following 5$^{th}$-order polynomial equation may be solved:

$$z(t)=c_5t^5+c_4t^4+c_3t^3+c_2t^2+c_1t+c_0$$

to obtain a time series of control points in the Z direction.

Referring back to FIG. 7, the motion path generator 214 may be configured to provide a function representing the motion path to the motion controller 218. The motion controller may be configured to effect movement of the movable object along the motion path from the position 932 (start point) to the reference point 930 (end point). The movable object may be configured to move along the motion path in a substantially curvilinear manner, as shown in FIG. 9. The motion controller may be configured to effect movement of the movable object in the target direction when the movable object reaches the reference point. The movable object may be configured to move in the target direction in a substantially linear manner starting from the reference point 930.

Figure 10:
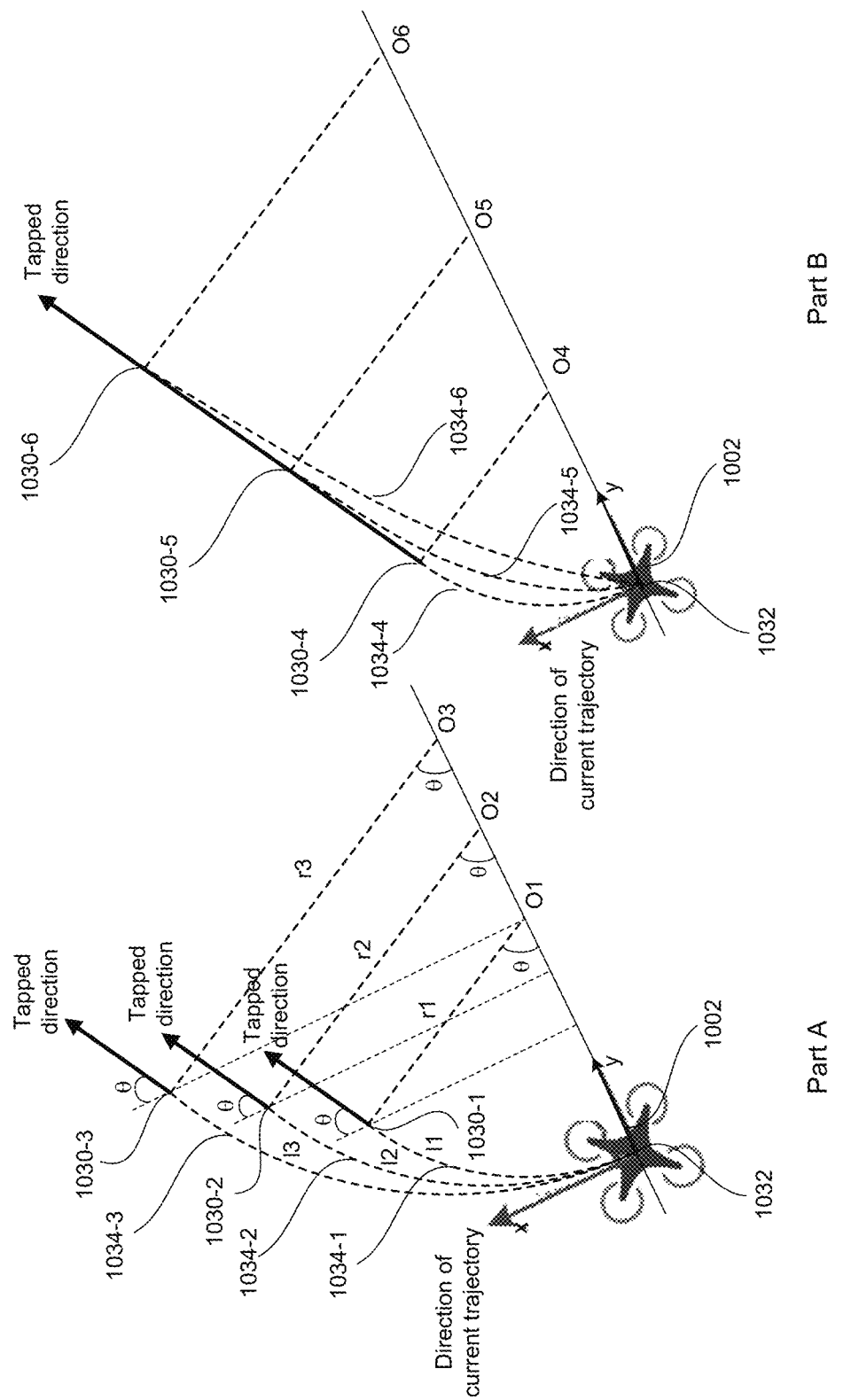
FIG. 10 shows examples of different motion paths that can be generated from a position of the movable object to a plurality of reference points associated with a target direction, in accordance with some embodiments.

FIG. 10 shows examples of different motion paths that can be generated from a position of the movable object to a plurality of reference points associated with one or more target directions, in accordance with some embodiments.

Part A of FIG. 10 shows different circular arc-shaped motion paths that can be generated from a position of a movable object to different reference points lying on parallel target direction vectors. A plurality of reference points 1030 may be estimated. The plurality of reference points may lie at different points along different target directions relative to a movable object 1002. The target directions may be parallel to one another. Optionally, the target directions need not be parallel to one another. A first reference point 1030-1 may be located closest to the movable object. A second reference point 1030-2 may be located further away from the movable object, between the first reference point 1030-1 and a third reference point 1030-3. The third reference point 1030-3 may be located furthest away from the movable object. Different motion paths 1034 may be generated from a position 1032 of the movable object to the respective reference points. For example, a first motion path 1034-1 may be generated from the position 1032 to the first reference point 1030-1; a second motion path 1034-2 may be generated from the position 1032 to the second reference point 1030-2; and a third motion path 1034-3 may be generated from the position 1032 to the third reference point 1030-3. Each motion path may form a circular arc having a radius and subtending an angle θ. The radius increases when the distance between the position 1032 and the reference point increases, and decreases when the distance between the position 1032 and the reference point decreases. For example, the motion path 1034-1 may form a circular arc having a radius r1 extending from the first reference point 1030-1 to a point O1; the motion path 1034-2 may form a circular arc having a radius r2 extending from the second reference point 1030-2 to a point O2; and the motion path 1034-3 may form a circular arc having a radius r3 extending from the third reference point 1030-3 to a point O3. The points O1, O2, and O3 may lie along a y-axis extending from the movable object. The y-axis may correspond to a pitch axis of the movable object. The movable object may be heading in an initial direction along the x-axis at the position 1032. The x-axis may correspond to a roll axis of the movable object. The radius r1, r2, and r3 may each form an angle θ at the points O1, O2, and O3 along the y-axis. The circular arc lengths of the first motion path, second motion path, and third motion path may be given by l1, l2, and l3, respectively. In the example of FIG. 10, r3>r2>r1 and l3>l2>l1, such that the motion path 1034-1 has the shortest arc length and the motion path 1034-3 has the longest arc length.

Part B of FIG. 10 shows different motion paths that can be generated from a position of a movable object to different reference points lying on a same target direction vector. The plurality of reference points may lie at different points along a same target direction relative to the movable object. A fourth reference point 1030-4 may be located closest to the movable object. A fifth reference point 1030-5 may be located further away from the movable object, between the fourth reference point 1030-4 and a sixth reference point 1030-6. The sixth reference point 1030-6 may be located furthest away from the movable object. Different motion paths 1034 may be generated from the position of the movable object to the respective reference points. For example, a fourth motion path 1034-4 may be generated from the position 1032 to the fourth reference point 1030-4; a fifth motion path 1034-5 may be generated from the position 1032 to the fifth reference point 1030-5; and a sixth motion path 1034-6 may be generated from the position 1032 to the sixth reference point 1030-6. In part B of FIG. 10, the fourth motion path 1034-4 may have the greatest amount of curvature, and the sixth motion path 1034-6 may have the least amount of curvature. For example, the fourth motion path 1034-4 may be curved, while the sixth motion path 1034-6 may be substantially linear.

Accordingly, motion paths of different lengths, different radii, and curvatures (e.g., curved, linear, or a combination of both) can be generated for a movable object to move from an initial or current position to a reference point lying on any target direction vector, or to different reference points lying along a same target direction vector. A user may select any reference point by providing an input via a computer-implemented interface (for example, by selecting or tapping a point on the image displayed on a user terminal). When the user selects a point that is closer to the movable object (e.g., reference point 1030-1), a motion path (e.g., motion path 1034-1) with a smaller radius can be generated from the current or initial position of the movable object to the reference point, for example as shown in part A of FIG. 10. Conversely, when the user selects a point that is further away from the movable object (e.g., reference point 1032-3), a motion path (e.g., motion path 1034-3) a larger radius can be generated from the current or initial position of the movable object to the reference point, for example as shown in part A of FIG. 10.

Figure 11:
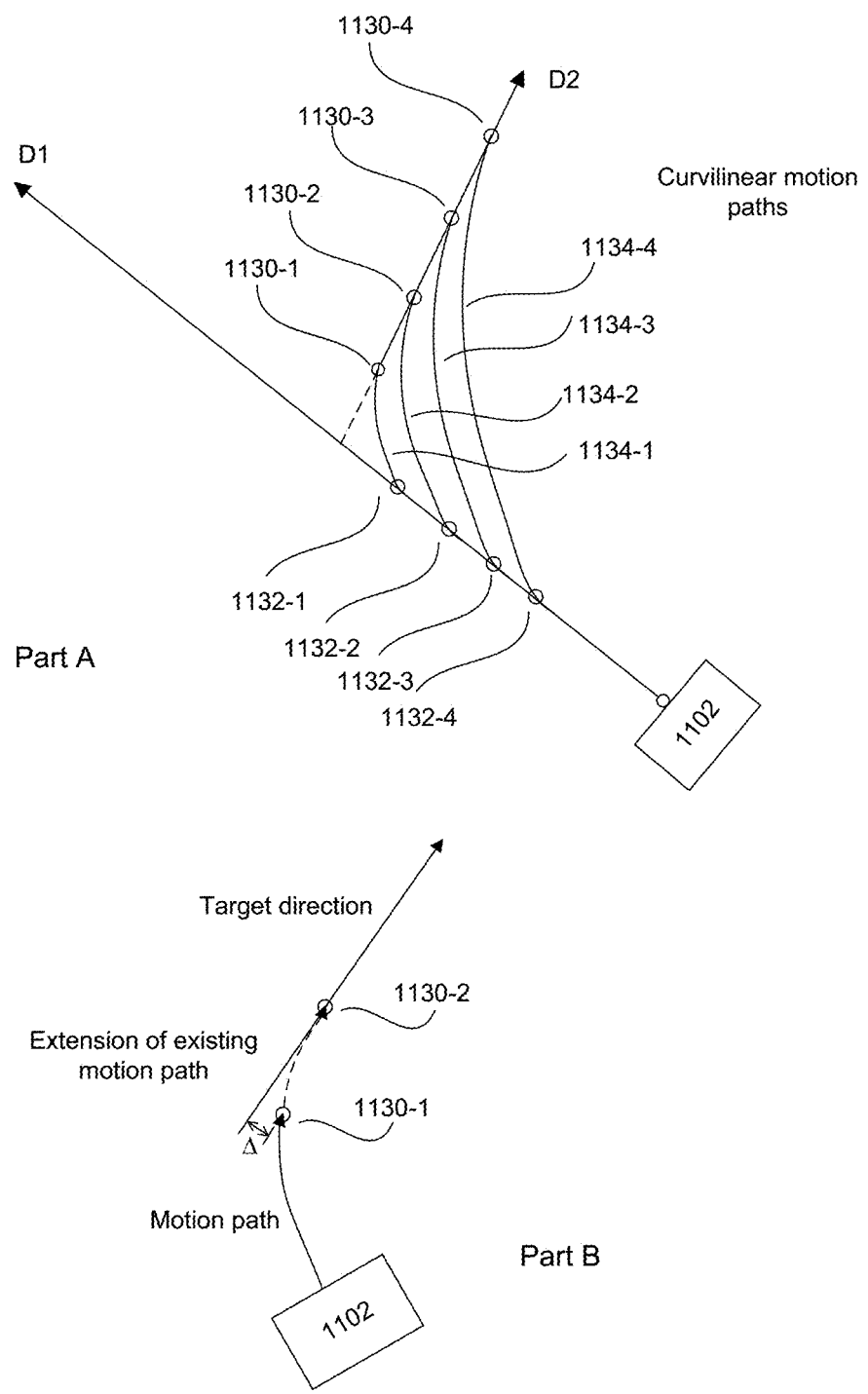
FIG. 11 part A shows examples of different motion paths that can be generated when a movable object moves from a first target direction to a second target direction, in accordance with some embodiments.

FIG. 11 part A shows examples of different motion paths that can be generated when a movable object moves from a first target direction to a second target direction, in accordance with some embodiments. As illustrated, a movable object may be initially traveling in a direction D1. The movable object may receive an instruction to head in a new target direction D2. The instruction may be provided via a user input to a user terminal.

A motion path generator may be configured to generate one or more motion paths 1134 for the movable object to switch course from its current travel in direction D1 to direction D2. Different motion paths may be generated based on different exit points along a vector in the initial direction D1, and different entry points along a vector in the target direction D2. For example, a first motion path 1134-1 may be generated between a first exit point 1132-1 to a first entry point 1130-1. Similarly, a second motion path 1134-2 may be generated between a second exit point 1132-2 to a second entry point 1130-2, a third motion path 1134-3 may be generated between a third exit point 1132-3 to a third entry point 1130-3, and a fourth motion path 1134-4 may be generated between a fourth exit point 1132-4 to a fourth entry point 1130-4. Any number of motion paths can be generated, and the movable object may be controlled to move along any of the motion paths. As shown in part A of FIG. 11, the first through fourth motion paths are curvilinear paths that enable the movable object to smoothly transition from its original direction of travel to the new target direction. The curvature of the first through fourth motion paths can be determined using, for example, the model and equations in FIG. 10.

The curvature of the motion path may also depend on one or more factors, such as speed and/or acceleration of the movable object when it receives the instruction to change direction, the degree of directional change, types of propulsion units, configuration of the movable object, specifications by the user of the movable object, or any other factor. In some instances, a standard curvature or gradual change of the motion path may be provided. Alternatively, the curvature may vary in accordance with one or more of the factors described. For instance, if the movable object is traveling very quickly, it may not be able to make as sharp a turn as if it were traveling more slowly. A motion controller may make a calculation to effect change of the direction in the motion path. The motion controller may have any of the characteristics as described elsewhere herein.

FIG. 11 part B shows the extension of an existing motion path of a movable object, in accordance with some embodiments. In some instances, an estimated reference point 1130-1 may not lie along a vector in a target direction, and may be offset from the vector by a distance Δ. In those instances, the existing motion path may be extended from the estimated reference point 1130-1 to a new reference point 1130-2 that lies along the vector in the target direction. The existing motion path may be extended by duplicating a portion of the motion path, and connecting the duplicated portion from the estimated reference point 1130-1 to the new reference point 1130-2. In some embodiments, a function (e.g., a polynomial function) representing the motion path may be adjusted in order to extend the motion path to the new reference point 1130-2. The adjustment to the function may include adjusting a degree (order) of the function, and/or adjusting one or more coefficients in the function.

As previously described, a movable object may be configured to move along a motion path from a current position or initial position to a reference point lying along a vector of a target direction. In many real world applications, the surrounding environment may include obstacles in the motion path of the movable object. These obstacles may be stationary, capable of movement, or in motion. As such, information about the external environment may be necessary for the movable object to avoid such obstacles by re-planning its motion path in real-time. In some embodiments, information about the external environment may be provided in a 3D map based on one or more images captured by one or more imaging devices. The motion path for the movable object may be adjusted based the 3D map.

Figure 12:
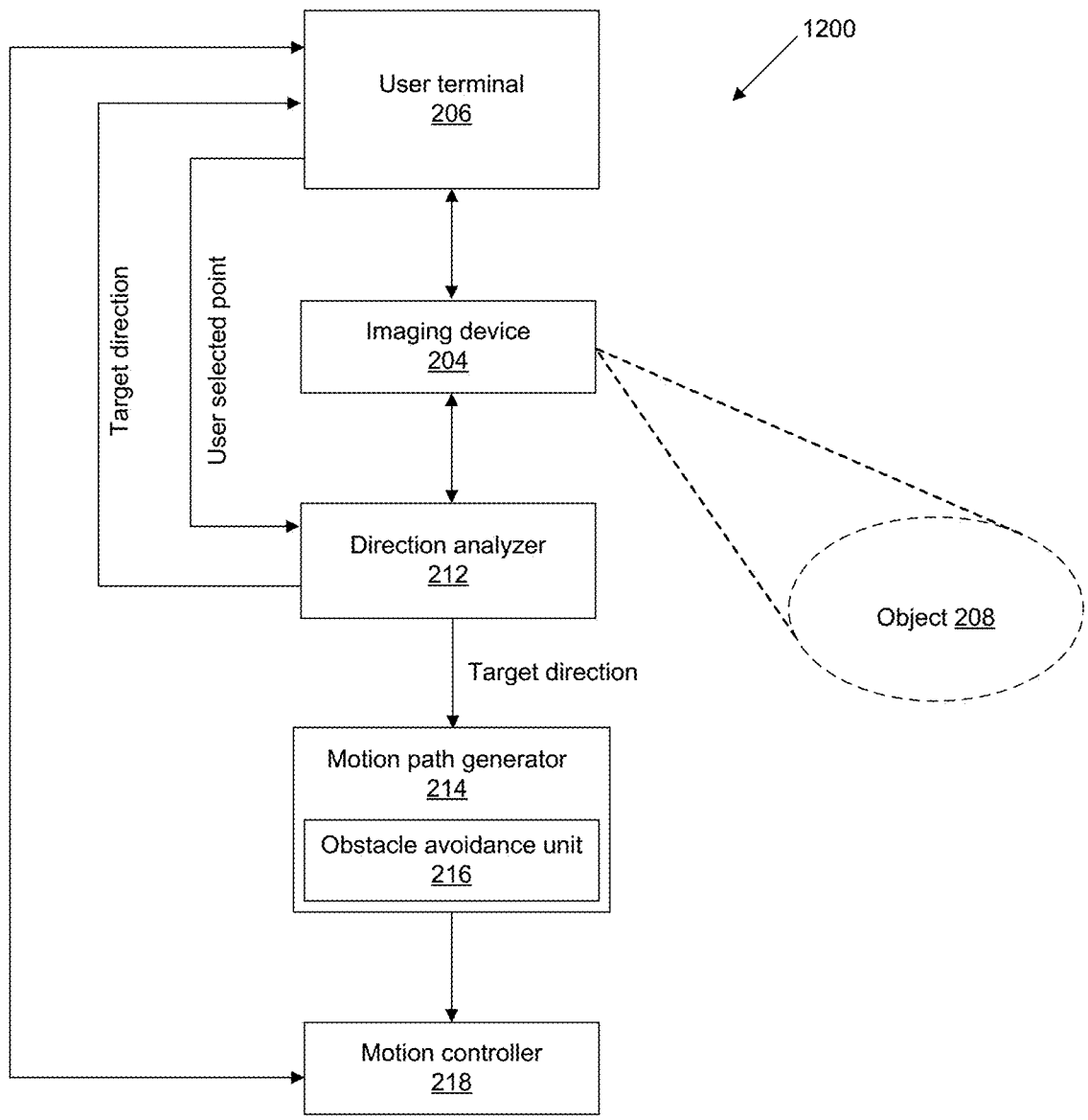
FIG. 12 shows an example of communications that can occur within a visual interactive navigation system, in accordance with some further embodiments.

FIG. 12 shows an example of communications that can occur within a visual interactive navigation system, in accordance with some embodiments. Visual navigation system 1200 in FIG. 12 is similar to system 700 in FIG. 7, except system 1200 further includes an obstacle avoidance unit 216. The obstacle avoidance unit may be co-located with the motion path generator. The obstacle avoidance unit may be a part of the motion path generator. Alternatively, the motion path generator may be a part of the obstacle avoidance unit. The obstacle avoidance unit may be placed anywhere in the system, for example onboard the movable object or at the user terminal. The obstacle avoidance unit and/or the motion path generator may be configured to generate a motion path traversing through passable (open) space within an environmental map such as a 3D map.

The obstacle avoidance unit may be configured to determine whether a movable object will collide with one or more obstacles based on a predicted movement of the movable object along a motion path. The motion path may correspond to those described elsewhere herein (e.g., in FIGS. 9, 10, and 11). The obstacle avoidance unit may be configured to adjust the motion path incrementally in at least one direction when the movable object is determined to collide with the one or more obstacles. The obstacle avoidance unit may be further configured to determine, for each incremental angle in the at least one direction, whether the movable object is going to collide with the one or more obstacles.

The obstacle avoidance unit may determine whether the movable object will collide with the one or more obstacles based on an environmental map. The environmental map may be a 3D map of the environment surrounding the movable object. The 3D map may be generated based on depth information in images of surrounding objects captured by one or more imaging devices. In some embodiment, the obstacle avoidance unit may be configured to overlay a trajectory indicative of the motion path onto the environmental map, and determine whether the trajectory is proximate to or intersects with the one or more obstacles depicted within the environmental map.

When the trajectory is not proximate to or does not intersect with the one or more obstacles depicted within the environmental map, the obstacle avoidance unit may determine there is no risk or a low risk of collision, and the existing motion path may be provided to the motion controller. Conversely, the obstacle avoidance unit may determine that the movable object will collide with the one or more obstacles when the trajectory is proximate to or intersects with the one or more obstacles depicted within the environmental map.

The obstacle avoidance unit may be configured to determine one or more angles at which the movable object is unlikely or not going to collide with the one or more obstacles, and to adjust the motion path of the movable object based on the one or more angles. The motion controller may be configured to control the movable object to move along the adjusted motion path.

In some embodiments, the obstacle avoidance unit may be configured to adjust an angle of the motion path incrementally in at least one direction. The angle of the motion path to be adjusted may include the angle θ which is given by $\theta = a\tan(y_{space}/x_{space})$, previously described in FIG. 9. Additionally, the angle of the motion path may include the angle α which is given by:

$$\alpha = a\tan(z_{space}/\sqrt{x_{space}^2 + y_{space}^2})$$

The angles θ and α are trigonometric functions of the coordinates ($x_{space}$, $y_{space}$, $z_{space}$) which corresponds to the direction vector OA of the user selected direction in camera coordinate system, as previously described with reference to FIG. 3. Accordingly, the motion path can be adjusted to traverse a series of angles in at least one direction, in order to determine one or more motion paths that are clear of obstacles. The at least one direction may be defined relative to one or more axes of a world coordinate system within the environment. For example, the at least one direction may be defined relative to an x-axis, a y-axis, or a z-axis of the world coordinate system.

In some embodiment, the obstacle avoidance unit may be configured to adjust the angle of the motion path incrementally N number of times in at least one direction. N may be any integer that is greater than 1. The angle of the motion path may be adjusted incrementally in fixed degree intervals. For example, the angle of the motion path may be adjusted incrementally in 1, 2, 3, 4, 5, 6, 7, 8, 9, 10, or 15 degree intervals. Alternatively, the angle of the motion path may be adjusted incrementally in greater than 15 degree intervals. Optionally, the angle of the motion path may be adjusted incrementally in less than 1 degree interval. In some embodiments, the angle of the motion path may be adjusted incrementally at varying degree intervals. The incremental angles may be defined relative to a point on the motion path. The point may correspond to an initial point on the motion path. The point may be associated with a location of the movable object. The obstacle avoidance unit may determine that the movable object will not collide with the one or more obstacles when the motion path is adjusted to a first angle. The motion controller may be configured to effect movement of the movable object along the adjusted motion path at the first angle to avoid the one or more obstacles.

In some embodiments, the angle of the motion path may be adjusted incrementally in a dynamic manner based on the presence or absence of obstacles in the motion path. For example, when the obstacle avoidance unit detects an obstacle in the motion path, the angle of the motion path may be adjusted in small increments, so as to determine the minimum adjustment in motion path of the movable object to bypass the obstacle. The angle of the motion path may be readjusted in larger increments after the movable object has successfully bypassed the obstacle.

In some embodiments, the angle of the motion path may be adjusted incrementally in a dynamic manner based on a density of obstacles in the motion path. For example, when the obstacle avoidance unit detects a high density of obstacles in the motion path, the angle of the motion path may be adjusted in small increments, so as to determine fine adjustments in motion path of the movable object to bypass the high density of obstacles. Conversely, when the obstacle avoidance unit detects a low density of obstacles in the motion path, the angle of the motion path may be adjusted in larger increments, since there may be more open (passable) space between the obstacles.

In some embodiments, the obstacle avoidance unit may be configured to adjust the angle of the motion path incrementally to a second angle greater than the first angle. The obstacle avoidance unit may determine that the movable object will not collide with the one or more obstacles when the motion path is adjusted to the second angle. The adjusted motion path at the second angle may provide a higher safety margin against collision compared to the adjusted motion path at the first path.

Figure 13:
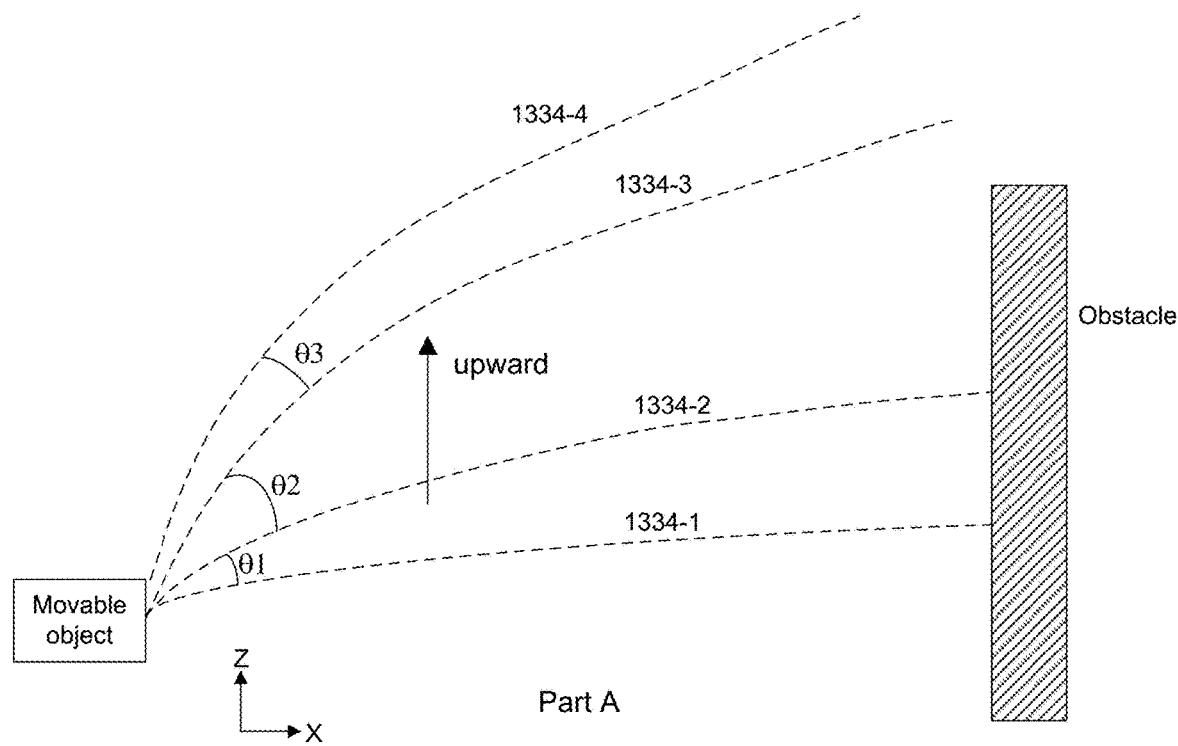
FIG. 13 shows adjustments in a motion path of a movable object incrementally in an upward direction or a downward direction to avoid an obstacle, in accordance with some embodiments.
Figure 13:
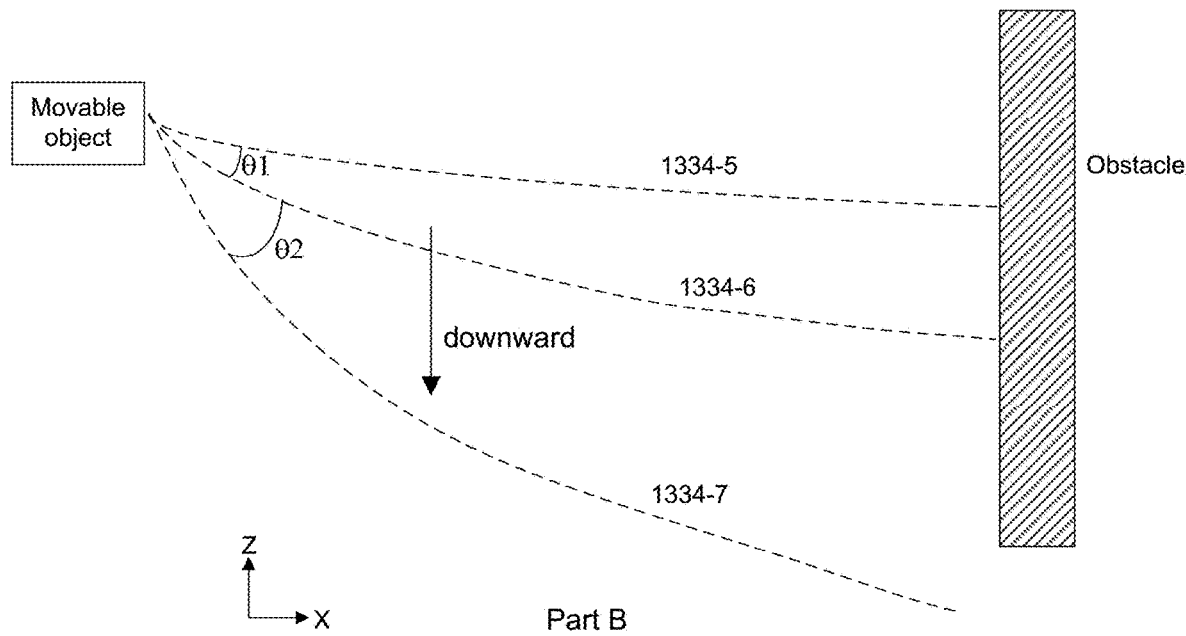

FIG. 13 shows adjustments in a motion path of a movable object incrementally in an upward direction or a downward direction to avoid an obstacle, in accordance with some embodiments. Referring to part A of FIG. 13, a movable object may be initially moving along a motion path 1334-1. The obstacle avoidance unit may detect that an obstacle lies in the motion path 1334-1 that would result in a collision. The obstacle avoidance unit may adjust an angle of the motion path incrementally in an upward direction to determine one or more angles at which the movable object is not going to or unlikely to collide with the obstacle. As shown in part A, the motion path 1334-1 may be first adjusted upward by an angle θ1 to a motion path 1334-2. The obstacle avoidance unit may be configured to determine whether a collision will occur on the adjusted motion path 1334-2, by determining if the trajectory of the adjusted motion path is proximate to or intersects with the obstacle depicted within an environmental map. In the example of part A, a collision still occurs in the adjusted motion path 1334-2. To determine a path that is free of obstacles, the motion path 1334-2 is next adjusted upward by an angle θ2 to 1334-3. In some instances, the angle θ2 may be substantially the same as θ1. In other instances, the angles θ1 and θ2 may be different. For example, the angle θ2 may be less than or greater than θ1. The obstacle avoidance unit may determine that there is no collision in the motion path 1334-3. Accordingly, the obstacle avoidance unit may change the motion path of the movable object from 1334-1 to 1334-3. The movable object is then controlled to move along the motion path 1334-3.

In some embodiments, the motion path 1334-3 may be adjusted upward by an angle θ3 to 1334-4. The motion path 1334-4 may provide a higher safety margin against collision compared to the motion 1334-3, and the movable object may be controlled to move along the motion path 1334-4.

Part B of FIG. 13 is similar to part A except the angle of the motion path is adjusted incrementally in a downward direction to determine one or more angles at which the movable object is not going to or unlikely to collide with the obstacle. As shown in part B, the motion path 1334-5 may be first adjusted downward by an angle θ1 to a motion path 1334-6. The obstacle avoidance unit may be configured to determine whether a collision will occur on the adjusted motion path 1334-6, by determining if the trajectory of the adjusted motion path is proximate to or intersects with the obstacle depicted within an environmental map. In the example of part B, a collision still occurs in the motion path 1334-6. To determine a path that is free of obstacles, the motion path 1334-6 is next adjusted downward by an angle θ2 to 1334-7. The obstacle avoidance unit may determine that there is no collision in the motion path 1334-7. Accordingly, the obstacle avoidance unit may change the motion path of the movable object from 1334-5 to 1334-7. The movable object is then controlled to move along the motion path 1334-7.

Figure 14:
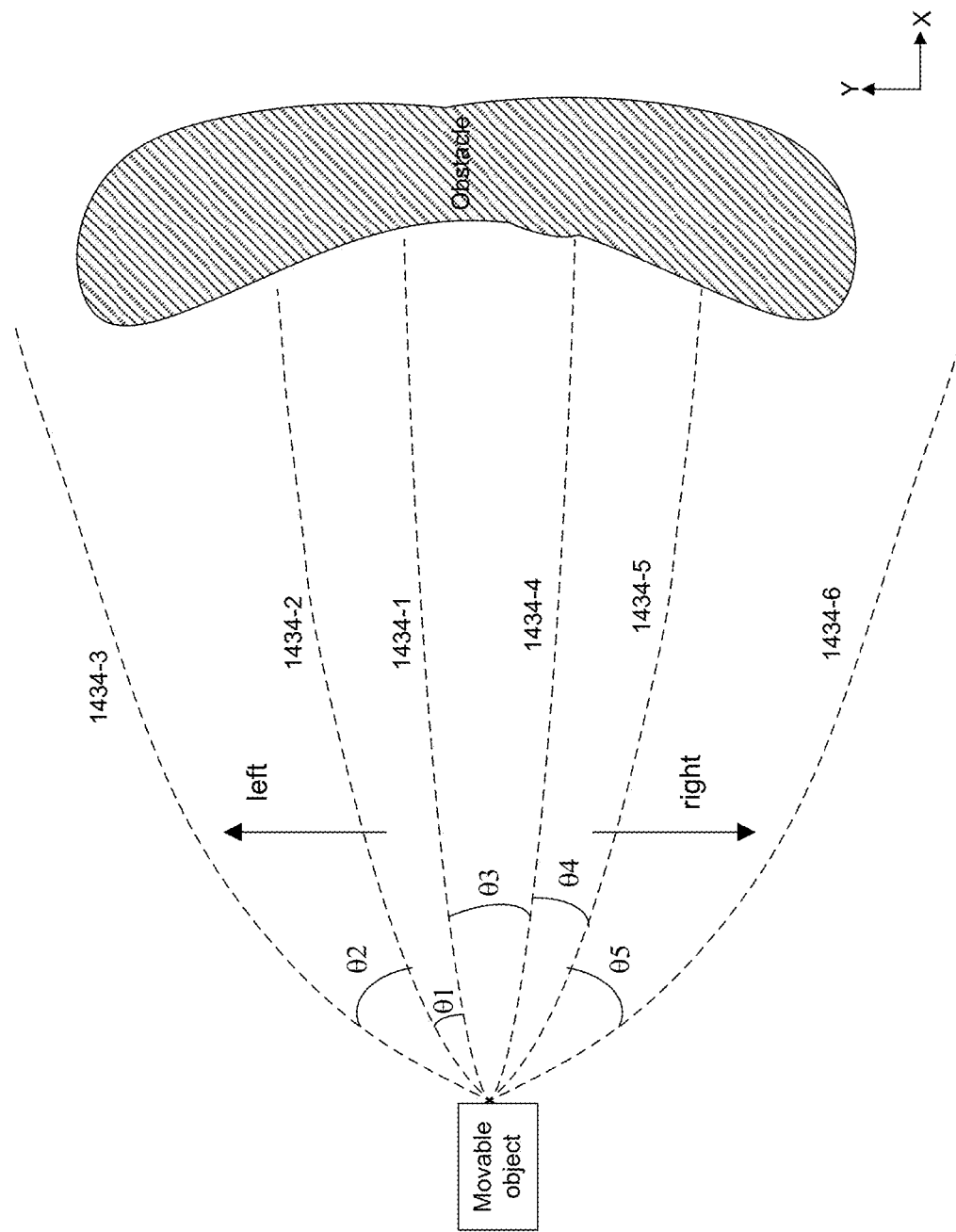
FIG. 14 shows adjustments in a motion path of a movable object horizontally in a left direction and a right direction to avoid an obstacle, in accordance with some embodiments.

FIG. 14 shows adjustments in a motion path of a movable object horizontally in a left direction and a right direction to avoid an obstacle, in accordance with some embodiments. In FIG. 13, the adjustments of the motion path may occur in a vertical direction (upward and downward) that is parallel to a yaw axis (z-axis) of the movable object. In FIG. 14, the adjustments of the motion path may occur in a horizontal direction (left and right) that is parallel to a pitch axis (y-axis) of the movable object.

In FIG. 14, the movable object may be initially moving along a motion path 1434-1. The obstacle avoidance unit may detect that an obstacle lies in the motion path that would result in a collision. The obstacle avoidance unit may adjust an angle of the motion path incrementally in a left direction or a right direction to determine one or more angles at which the movable object is not going to or unlikely to collide with the obstacle. As an example, the motion path 1434-1 may be first adjusted to the left by an angle θ1 to a motion path 1434-2. The obstacle avoidance unit may be configured to determine whether a collision will occur on the adjusted motion path 1434-2, by determining if the trajectory of the adjusted motion path is proximate to or intersects with the obstacle depicted within an environmental map. A collision still occurs in the motion path 1434-2. To determine a path that is free of obstacles, the motion path 1434-2 is next adjusted to the left by an angle θ2 to 1434-3. In some instances, the angle θ2 may be substantially the same as θ1. In other instances, the angles θ1 and θ2 may be different. For example, the angle θ2 may be less than or greater than θ1. The obstacle avoidance unit may determine that there is no collision in the motion path 1434-3. Accordingly, the obstacle avoidance unit may change the motion path of the movable object from 1434-1 to 1434-3.

In some cases, instead of adjusting to the left, the motion path 1434-1 can be adjusted to the right. For example, the motion path 1434-1 can be adjusted to the right by an angle θ3 to a motion path 1434-4, and the motion path 1430-4 adjusted to the right by an angle θ4 to a motion path 1434-5. A clear path may be obtained by adjusting the motion path 1434-5 to the right by an angle θ5 to a motion path 1434-6.

Figure 15:
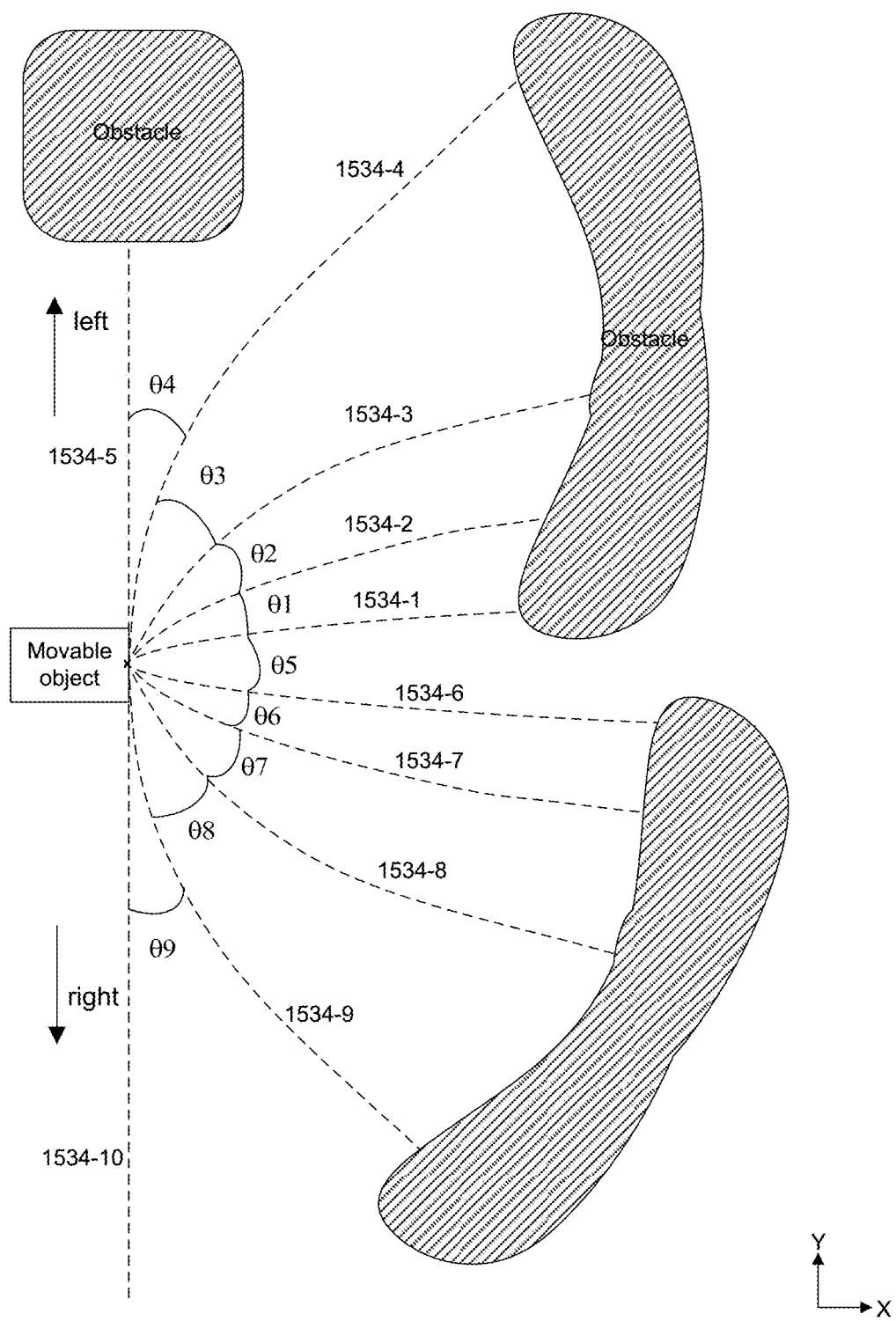
FIG. 15 shows adjustments in a motion path of a movable object such that the movable object moves horizontally in a left direction or a right direction to avoid an obstacle, in accordance with some embodiments.

FIG. 15 shows adjustments in a motion path of a movable object such that the movable object moves horizontally in a left direction or a right direction to avoid an obstacle, in accordance with some embodiments. FIG. 15 is similar to FIG. 14 except the environment in FIG. 15 includes a plurality of obstacles, and the adjusted motion paths include substantially linear paths.

In FIG. 15, the adjustments of a motion path 1534-1 may occur in a horizontal direction (left and right) that is parallel to a pitch axis (y-axis) of the movable object. The obstacle avoidance unit may determine that collisions with obstacles may still occur even though the motion path 1534-1 is sequentially adjusted to the left by angles θ1, θ2, and θ3, and sequentially adjusted to the right by angles θ5, θ6, θ7, and θ8. The obstacle avoidance unit may subsequently determine whether collision still occurs with a horizontal bypass strategy. The horizontal bypass strategy may include adjusting the motion path such that it is substantially linear in the left or right directions. In the example of FIG. 15, the motion paths in the horizontal bypass strategy may be substantially parallel or aligned with the pitch axis (y-axis) of the movable object. A collision is determined to occur in the left horizontal bypass motion path 1534-5. However, a clear path may be obtained by the right horizontal bypass motion path 1534-10. Accordingly, the obstacle avoidance unit may change the motion path of the movable object from 1534-1 to 1534-10.

As described above with reference to FIGS. 13 through 15, the obstacle avoidance unit may be configured to adjust the angle of the motion path incrementally in a plurality of directions in a sequential manner. For example, the obstacle avoidance unit may adjust the angle of the motion path incrementally in a first direction to determine one or more angles at which the movable object is not going to or unlikely to collide with the one or more obstacles. When no angles are determined for the first direction, the obstacle avoidance unit may further adjust the angle of the motion path incrementally in a second direction to determine one or more angles at which the movable object is not going to or unlikely to collide with the one or more obstacles. When no angles are determined for the second direction, the obstacle avoidance unit may further adjust the angle of the motion path incrementally in a third direction to determine one or more angles at which the movable object is not going to or unlikely to collide with the one or more obstacles. In some embodiments, two or more of the first direction, second direction, and third direction may be orthogonal to each other. In some embodiments, two or more of the first direction, second direction, and third direction may be parallel to each other. In some embodiments, two or more of the first direction, second direction, and third direction may be opposite to each other. In some alternative embodiments, two or more of the first direction, second direction, and third direction may be oblique to each other. In some cases, the first direction may correspond to an upward direction that is parallel to a yaw axis (z-axis) of the movable object, the second direction may correspond to a leftward direction that is parallel to a pitch axis (y-axis) of the movable object, and the third direction may correspond to a rightward direction that is also parallel to the pitch axis (y-axis) of the movable object but opposite to the second direction.

Figure 16:
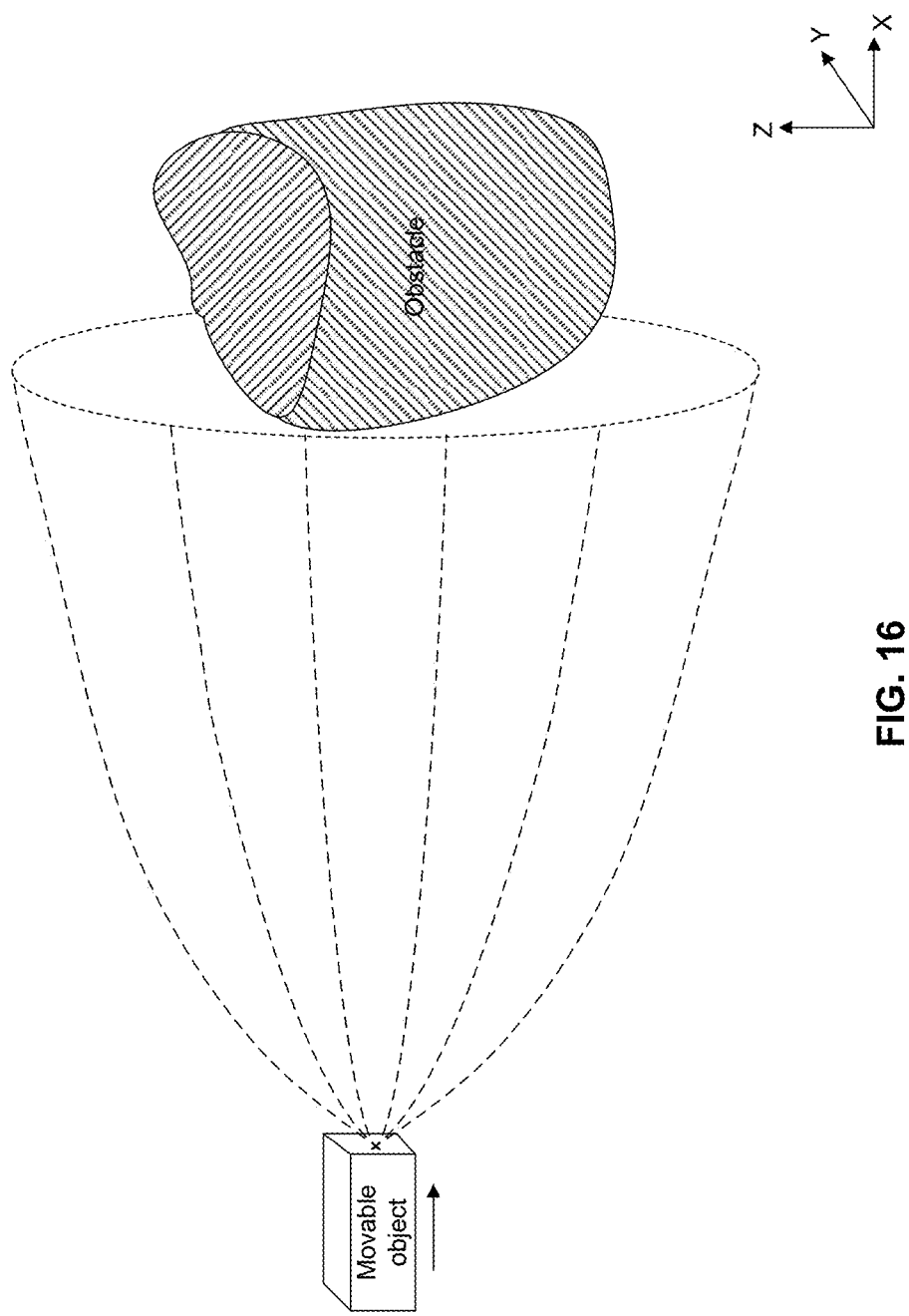
FIG. 16 shows adjustments in a motion path of a movable object in a 3-D sweeping configuration to avoid an obstacle, in accordance with some embodiments.

FIG. 16 shows adjustments in a motion path of a movable object in a 3-D sweeping configuration to avoid an obstacle, in accordance with some embodiments. In FIG. 16, the angle of the motion path may be adjusted incrementally in a radial manner, such that the plurality of adjusted motion paths sweep outwardly from the movable object in a 3D configuration. The angle of the motion path may be adjusted incrementally in a plurality of directions that are disposed orthogonally or obliquely to each of the roll, yaw, and pitch axes of the movable object. The plurality of directions may include at least a first direction extending upward relative to the roll axis of the movable object, a second direction extending leftward relative to the roll axis, a third direction extending rightward relative to the roll axis, and a fourth direction extending downward relative to the roll axis. In some embodiments, the angle of the motion path may be adjusted incrementally in the first direction, followed by the second direction, third direction, and fourth direction.

Figure 17:
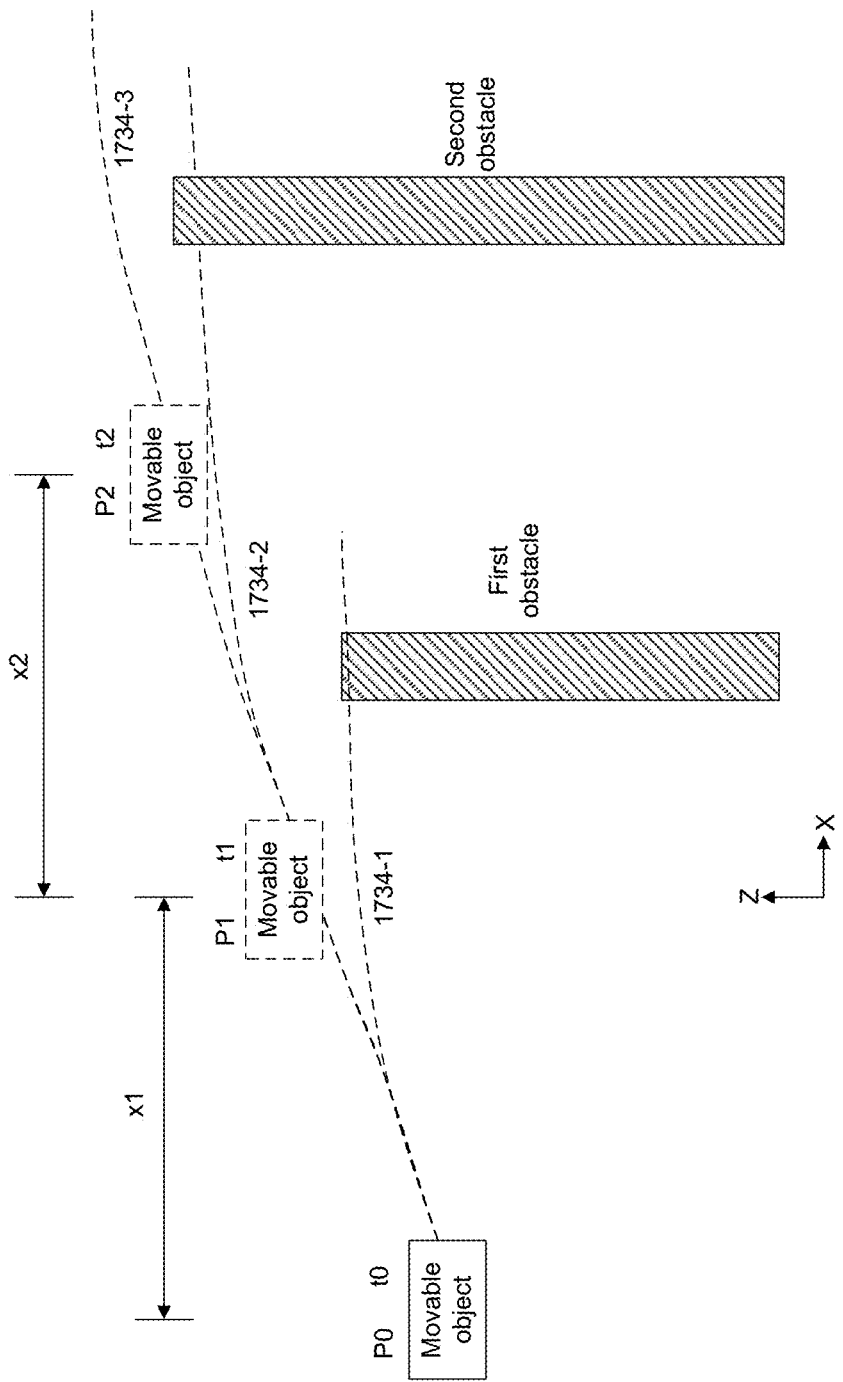
FIG. 17 shows repeated adjustments in a motion path of a movable object to avoid one or more obstacles, in accordance with some embodiments.

FIG. 17 shows repeated adjustments in a motion path of a movable object to avoid one or more obstacles, in accordance with some embodiments. As previously described, the obstacle avoidance unit may be configured to (1) determine whether the movable object will collide with one or more obstacles based on a predicted movement of the movable object along a motion path, (2) adjust an angle of the motion path incrementally in at least one direction when the movable object is determined to collide with the one or more obstacles, and (3) determine, for each incremental angle in the at least one direction, whether the movable object is going to collide with the one or more obstacles. In some embodiments, the obstacle avoidance unit may be configured to repeat the above steps (1) through (3) at fixed distance intervals or at variable distance intervals when the movable object is moving along the adjusted motion path. For example, a motion path 1734-1 may be adjusted upward at position P0 to a motion path 1734-2, in order for the movable object to avoid collision with a first obstacle lying in the motion path 1734-1. The movable object may be subsequently controlled to move along the motion path 1734-2. When the movable object reaches a position P1, the obstacle avoidance unit may repeat the above obstacle avoidance determination steps. The position P1 may be separated from the position P0 of the movable object by a distance x1. The distance x1 may be measured along an x-axis direction of travel. The position P1 may be closer to the first obstacle than the position P0. The motion path 1734-2 may be adjusted upward at position P1 to a motion path 1734-3, in order for the movable object to avoid collision with a second obstacle lying in the motion path 1734-2. The movable object may be subsequently controlled to move along the motion path 1734-3. When the movable object reaches a position P2, the obstacle avoidance unit may repeat the above obstacle avoidance determination steps. The position P2 may be separated from the position P1 of the movable object by a distance x2. The distance x2 may also be a measured along the x-axis direction of travel. The position P2 may be closer to the second obstacle than the position P1. In some embodiments, the distances x1 and x2 may be the same such that obstacle avoidance steps are performed at fixed distance intervals. Alternatively, the distances x1 and x2 may be different such that obstacle avoidance steps are performed at variable distance intervals. The distance intervals may depend on the relative position between the movable object and the obstacles as the movable object moves along the motion path (or adjusted motion paths). For example, the obstacle avoidance steps may be performed when the movable object is moving along the adjusted motion path and is at a predetermined distance from the one or more obstacles. Likewise, the obstacle avoidance steps may be performed when the movable object is moving along the adjusted motion path closer to the one or more obstacles. When the movable object has moved closer to the one or more obstacles, clearer images of the obstacles may be obtained which allows the environmental map to be updated. Accordingly, the obstacle avoidance unit can fine-tune and adjust the motion paths based on the updated environmental map.

In some embodiments, the obstacle avoidance unit may be configured to repeat the above obstacle avoidance steps (1) through (3) at fixed time intervals or at variable time intervals when the movable object is moving along the adjusted motion path. For example, referring to FIG. 17, each sequence of the obstacle avoidance steps may be performed at time t0, t1, and t2. A first time interval may be given by (t1–t0), and a second time interval may be given by (t2–t1). In some embodiments, the first time interval and the second time interval may be the same such that the obstacle avoidance steps are performed at fixed time intervals. Alternatively, the first time interval and the second time interval may be different such that the obstacle avoidance steps are performed at variable time intervals.

In some embodiments, the obstacle avoidance unit may be configured to generate a motion path of the movable object based on a target direction within the environment and one or more motion characteristics of the movable object. The obstacle avoidance unit may be further configured to determine, using an environmental map representative of at least a portion of the environment, a probability of collision of the movable object with one or more obstacles. The probability may be determined based on a predicted movement of the movable object along the motion path and a predicted movement of the one or more obstacles onto the motion path.

The obstacle avoidance unit may be configured to overlay the motion path onto the environmental map, to determine whether one or more obstacles lies along the motion path. The environmental map may comprise a topological map or a metric map. The metric map may comprise at least one of the following: a point cloud, a 3D grid map, a 2D grid map, or a 2.5D grid map. The metric map may also comprise an occupancy grid map.

The obstacle avoidance unit may be configured to determine the predicted movement of the one or more obstacles onto the motion path by analyzing the environmental map in real-time. The predicted movement of the one or more obstacles may be determined based on one or more motion characteristics of the obstacles. The one or more motion characteristics may comprise a velocity and/or acceleration of the obstacles along and/or about one or more axes within the environment.

The obstacle avoidance unit may be configured to determine whether the probability of collision is greater than or equal to a threshold value. The obstacle avoidance unit may determine that the movable object is likely or going to collide with the one or more obstacles when the probability of collision is greater than or equal to the threshold value. Conversely, the obstacle avoidance unit may determine that the movable object is unlikely or not going to collide with the one or more obstacles when the probability of collision is below the threshold value. The motion controller may be configured to maintain the motion path of the movable object when the probability of collision is below the threshold value, and adjust the motion path of the movable object when the probability of collision is greater than or equal to the threshold value. The obstacle avoidance unit may be configured to adjust the motion path by varying an angle of the motion path incrementally in at least one direction, and determine, for each incremental angle in the at least one direction, whether the probability of collision is below than the threshold value. In some embodiments, the obstacle avoidance unit may adjust the motion path by varying an angle of the motion path incrementally in a plurality of directions, and determine, for each incremental angle in each direction, whether the probability of collision is below than the threshold value. The obstacle avoidance unit may determine one or more adjusted motion paths having one or more selected angles at which the probability of collision is below the threshold value. The motion controller may control the movable object to move along the one or more adjusted motion paths having the one or more selected angles.

Figure 18:
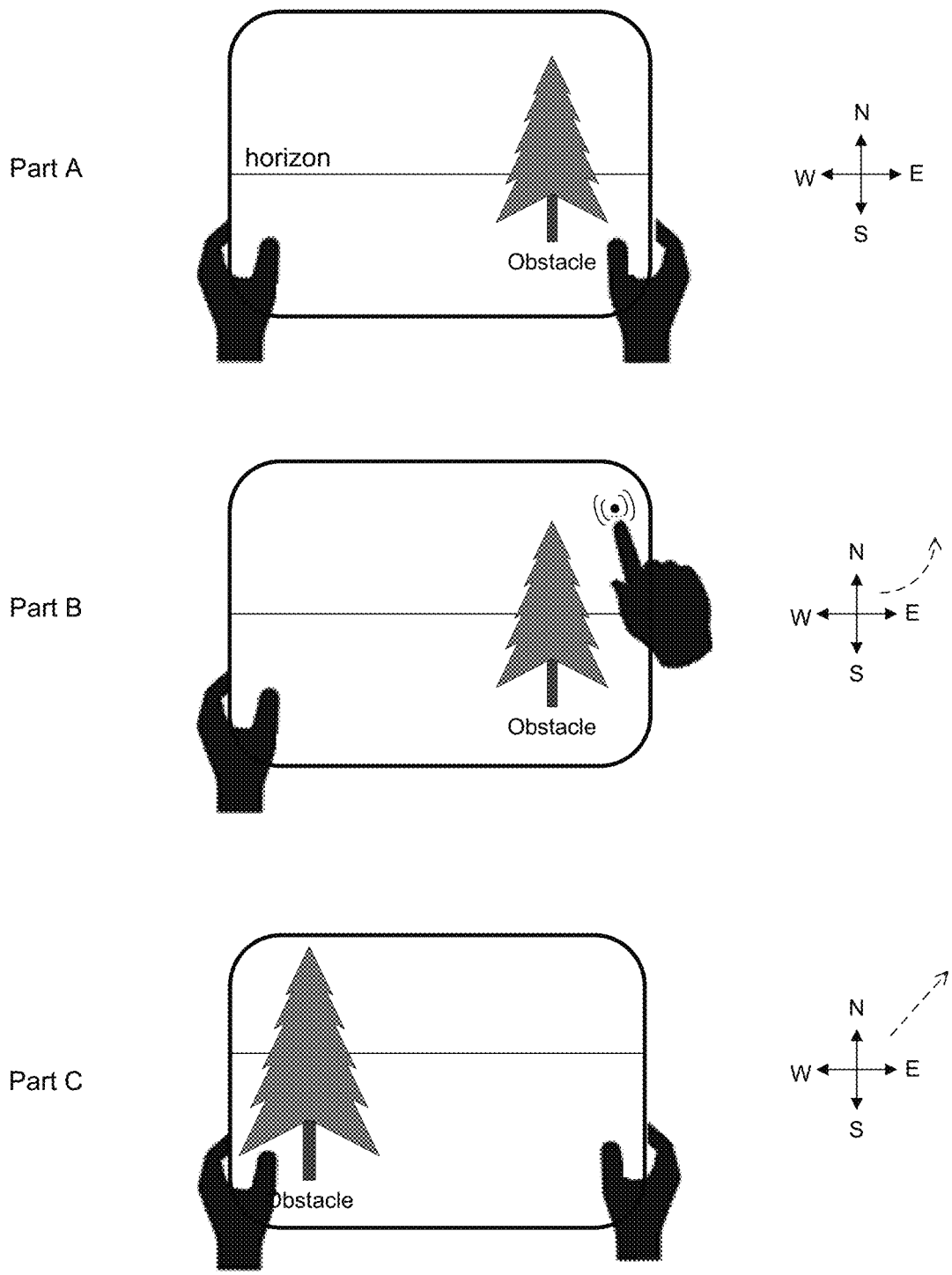
FIG. 18 shows an example of a user interface (UI) through which a user can select a target direction, and whereby a motion path is automatically adjusted for a movable object to avoid an obstacle in the target direction, in accordance with some embodiments.

FIG. 18 shows an example of a user interface (UI) through which a user can select a target direction, and whereby a motion path is automatically adjusted for a movable object to avoid an obstacle in the target direction, in accordance with some embodiments. Part A shows an initial display of an environment. Part B shows a user selecting a target direction within the display, and an obstacle may be in the motion path. Part C shows an image of the movable object traveling in an adjusted motion path having avoided the obstacle. The movable object may be a UAV. Corresponding movements/headings of the UAV are shown in the compasses.

Part A shows an initial display of an environment. As previously described, the initial display may include an image which may include a FPV, and/or a map view. Initially, an image of the environment may be presented before a user makes a selection for a target direction. One or more objects within the environment may be displayed, such as a tree. The corresponding compass may show that the UAV may optionally not be moving. In alternate embodiments, a UAV may already be moving when a user makes a selection for a target direction.

Part B shows a user selecting a target direction within the display. For instance, the target direction may be in a northeast direction. The target direction may be selected in any manner as described in greater detail elsewhere herein. In some instances, one or more objects may become obstacles when in the UAV's path when the UAV is traveling. For instance, a user may select a target direction in the northeastern direction. A tree may lie in the path in the northeastern direction.

The UAV may automatically adjust the flight path of the UAV to avoid the obstacle presented, using one or more of the previously-described obstacle avoidance methods. The corresponding compass shows that the UAV may go around the obstacle. A flight controller, such as a flight controller described elsewhere herein, may aid in determining how the UAV is to avoid the obstacle. The UAV may circumnavigate the obstacle laterally and/or may travel above and/or below the obstacle. In some instances, the obstacle may be a stationary obstacle. Alternatively, the obstacle may be a moving obstacle. Any obstacle avoidance technique, such as those described in greater detail elsewhere herein, may be employed.

Part C shows an image of the movable object traveling in the target direction, having avoided the obstacle. For instance, a UAV may fly around a tree that was an obstacle, which permits the UAV to continue on in its original target direction, which may be in the northeast, as shown by the corresponding compass.

Figure 19:
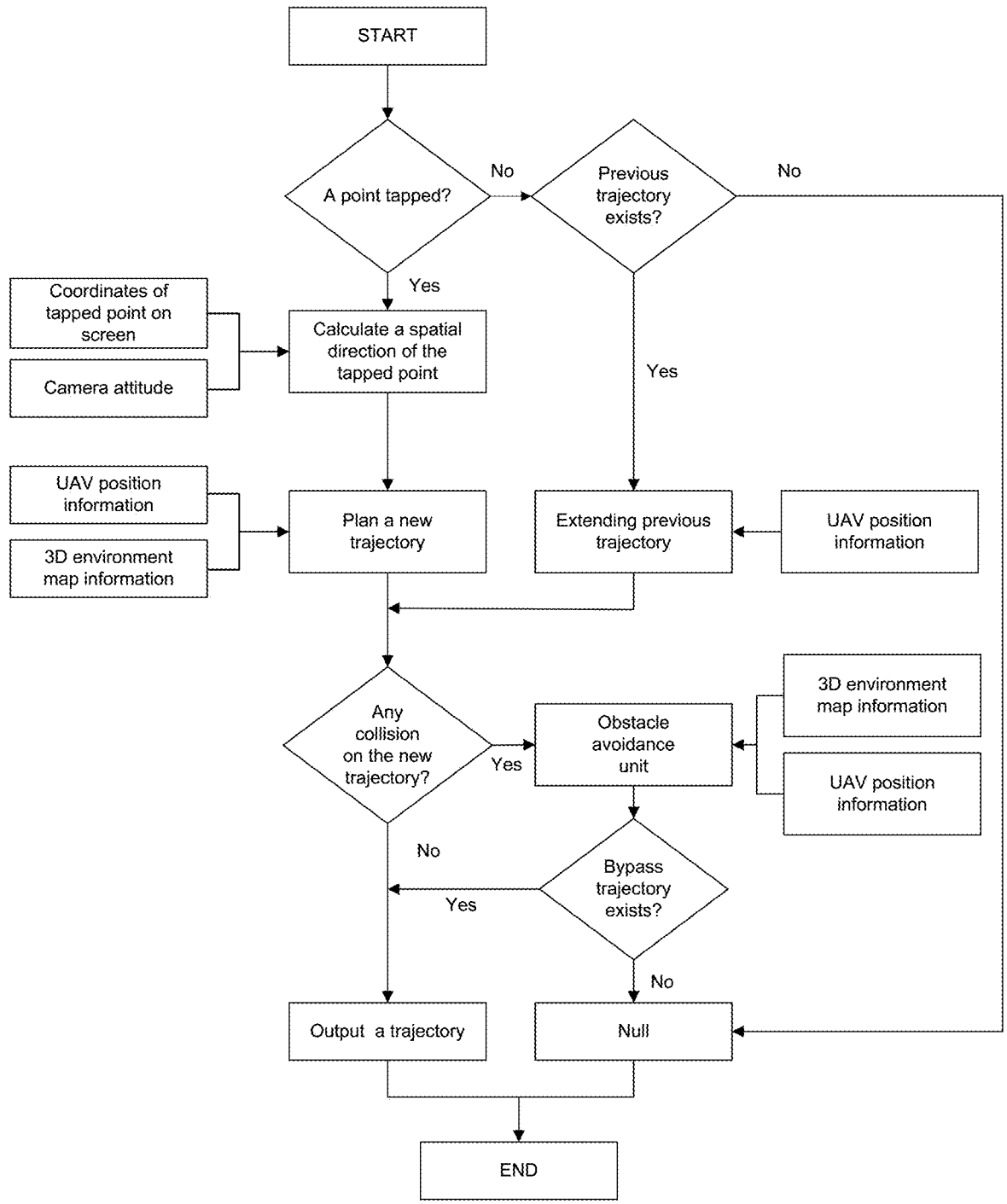
FIG. 19 shows a flowchart of a method for generating a motion path for a movable object, in accordance with some embodiments.

FIG. 19 shows a flowchart of a method for generating a motion path for a movable object, in accordance with some embodiments. First, an application on a user terminal may determine whether a point has been selected ("tapped") on an image on a computer-implemented display. The display may be part of the user terminal, and the application may be executed using a combination of software and hardware on the user terminal. The image may be, for example a FPV view captured by a camera on a movable object. The movable object may be a UAV. The user terminal can be used by a user to control the UAV.

If the application determines that a point has been tapped, the application may transmit the image coordinates of the tapped point to a direction analyzer. The direction analyzer may be configured to calculate a spatial direction of the tapped point based in part on the coordinates of the tapped point on the display screen and an attitude of the camera. The spatial direction of the tapped point may be calculated using the methods previously described in FIGS. 2 and 3.

Next, the spatial direction of the tapped point may be provided to a motion path generator. The motion path generator may be configured to plan a new trajectory from its initial or current position to a reference point lying in the spatial direction. The trajectory may be a motion path. The new trajectory may be planned based on UAV position information and 3D environmental map information.

Next, an obstacle avoidance unit may determine whether the UAV will collide with any obstacle on the new trajectory. If no collision is determined, the trajectory may be output to a flight controller. The flight controller may be configured to control the UAV to fly along the trajectory.

If a collision is determined, the obstacle avoidance unit may execute a series of obstacle avoidance steps (e.g., those previously described in FIGS. 13-17) to determine a bypass trajectory. The obstacle avoidance steps may be based on 3D environmental map information and UAV position information. If a bypass trajectory exists, the obstacle avoidance unit may output the bypass trajectory to the flight controller which then controls the UAV to fly along the bypass trajectory. If no bypass trajectory exists, the obstacle avoidance unit may provide instructions to the flight controller, to control the UAV such that the UAV hovers at its current position or lands.

In some cases, if a point has not been tapped, the application may then determine whether a previous trajectory exists. If a previous trajectory does not exist, the application may provide instructions to the flight controller, to control the UAV such that the UAV hovers at its current position or lands. If a previous trajectory exists, the motion path generator may extend the previous trajectory based on UAV position information. The obstacle avoidance unit may subsequently determine whether the UAV will collide with any obstacle on the extended trajectory, using one or more of the above-described obstacle avoidance steps.

Figure 20:
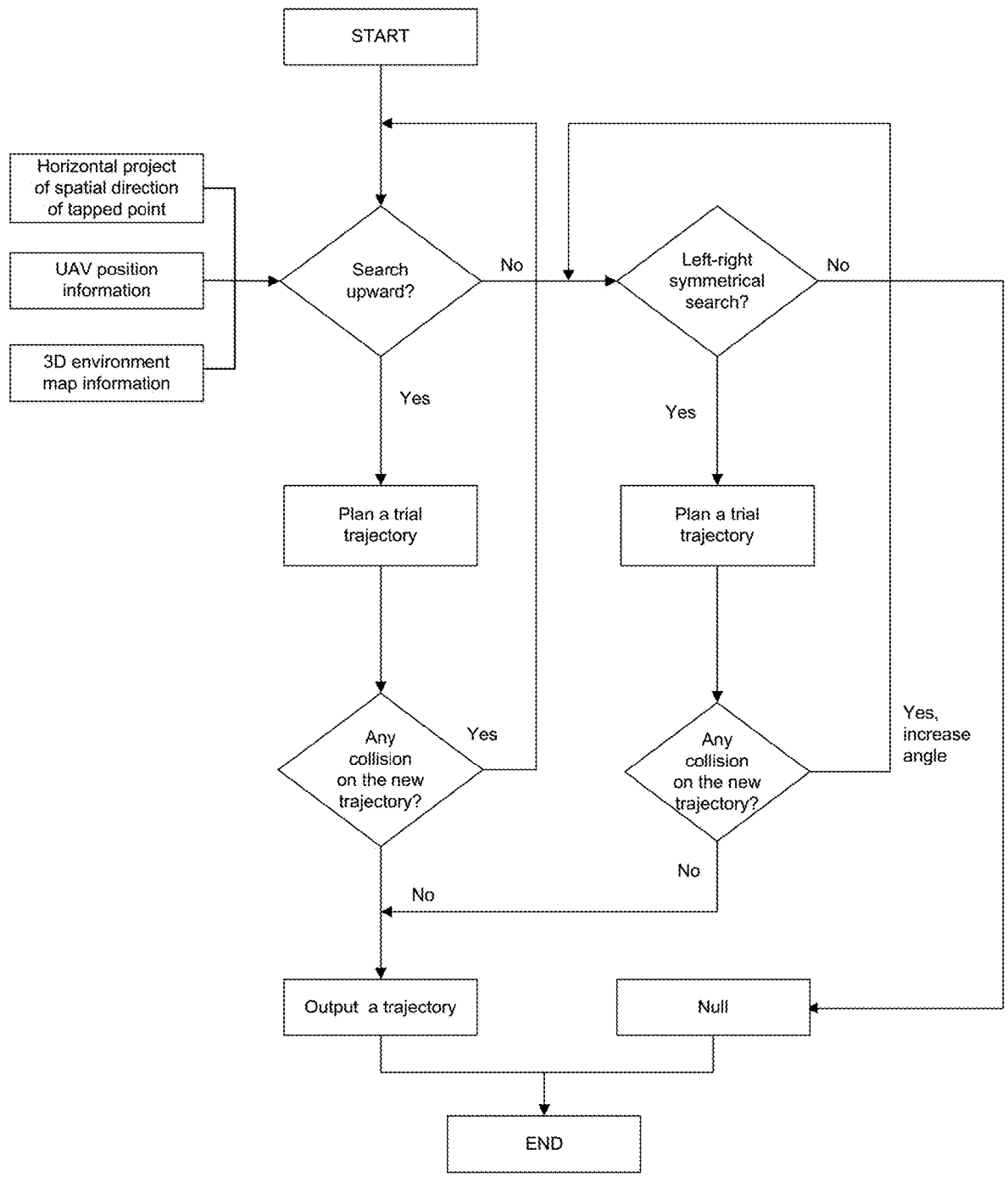
FIG. 20 shows a flowchart of an obstacle avoidance method for a movable object, in accordance with some embodiments.

FIG. 20 shows a flowchart of an obstacle avoidance method for a movable object, in accordance with some embodiments. FIG. 20 illustrates the obstacle avoidance steps of FIG. 19 in more detail. When a collision is determined, the obstacle avoidance unit may first search upward for an obstacle-free trajectory, based on (1) a horizontal projection of the spatial direction of the tapped point, (2) UAV position information, and (3) 3D environmental map information (as previously described in FIG. 13). The obstacle avoidance unit may search by adjusting an angle of the flight trajectory in an upward direction to plan a trial trajectory. The trial trajectory may be an adjusted motion path. The obstacle avoidance unit may determine whether any collision will occur on the trial trajectory. If no collision is determined for the trial trajectory, the obstacle avoidance unit may output the trial trajectory as a new trajectory. If a collision is determined to exist, the obstacle avoidance unit may incrementally adjust the angle of the flight trajectory, and plan another trial trajectory from the next incremental angle.

In some cases, instead of first searching upward for an obstacle-free trajectory, the obstacle avoidance unit may first perform a left-right symmetrical search (e.g., as shown in FIGS. 14 and 15). For example, the obstacle avoidance unit may search by adjusting an angle of the flight trajectory in a left direction and/or a right direction to plan a trial trajectory. The obstacle avoidance unit may determine whether any collision will occur on the trial trajectory. If no collision is determined for the trial trajectory, the obstacle avoidance unit may output the trial trajectory as a new trajectory. If a collision is determined to exist, the obstacle avoidance unit may incrementally adjust the angle of the flight trajectory, and plan another trial trajectory from the next incremental angle. In some cases, the obstacle avoidance unit may be configured to search upwards, to the left, and/or to the right N number of times to determine one or more obstacle-free trajectories.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 cm³, 200 cm³, 300 cm³, 500 cm³, 750 cm³, 1000 cm³, 5000 cm³, 10,000 cm³, 100,000 cm³, 1 m³, or 10 m³.

In some embodiments, the movable object may have a footprint (which may refer to the lateral cross-sectional area encompassed by the movable object) less than or equal to about: 32,000 cm², 20,000 cm², 10,000 cm², 1,000 cm², 500 cm², 100 cm², 50 cm², 10 cm², or 5 cm². Conversely, the footprint may be greater than or equal to about: 32,000 cm², 20,000 cm², 10,000 cm², 1,000 cm², 500 cm², 100 cm², 50 cm², 10 cm², or 5 cm².

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 21:
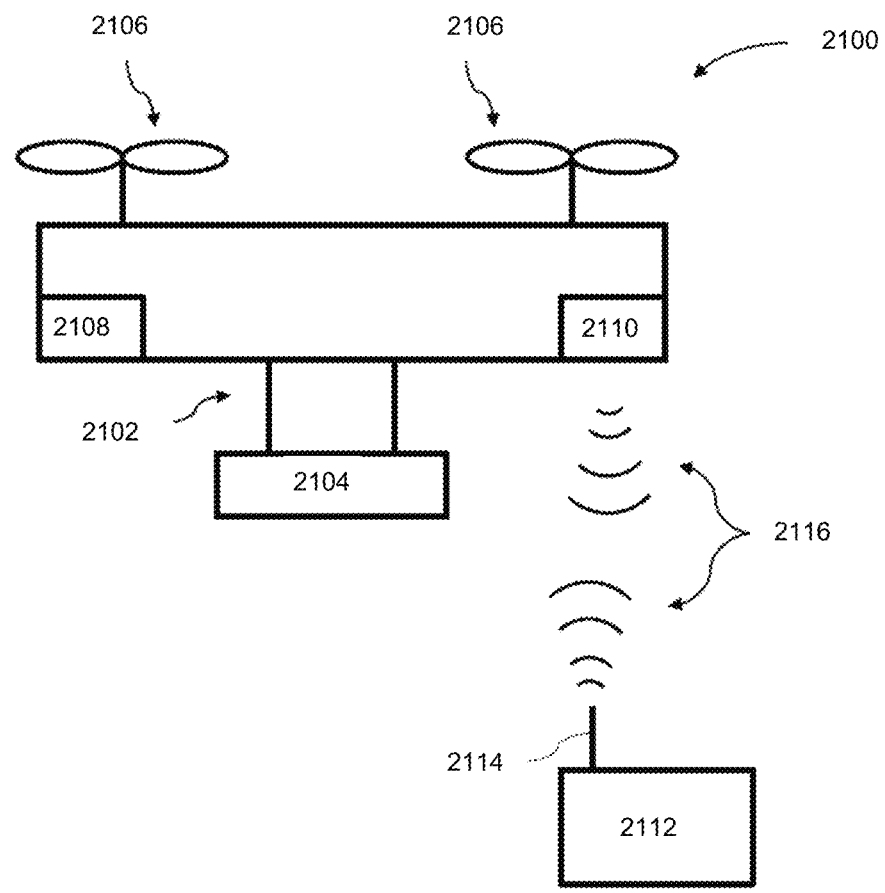
FIG. 21 is a schematic block diagram of a system for controlling a movable object, in accordance with some embodiments.

FIG. 21 illustrates a movable object 2100 including a carrier 2102 and a payload 2104, in accordance with embodiments. Although the movable object 2100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2104 may be provided on the movable object 2100 without requiring the carrier 2102. The movable object 2100 may include propulsion mechanisms 2106, a sensing system 2108, and a communication system 2110.

The propulsion mechanisms 2106 can include one or more of rotors, propellers, blades, engines, motors, wheels, axles, magnets, or nozzles, as previously described. For example, the propulsion mechanisms 2106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2106 can be mounted on the movable object 2100 using any suitable means, such as a support element (e.g., a drive shaft) as described elsewhere herein. The propulsion mechanisms 2106 can be mounted on any suitable portion of the movable object 2100, such on the top, bottom, front, back, sides, or suitable combinations thereof.

In some embodiments, the propulsion mechanisms 2106 can enable the movable object 2100 to take off vertically from a surface or land vertically on a surface without requiring any horizontal movement of the movable object 2100 (e.g., without traveling down a runway). Optionally, the propulsion mechanisms 2106 can be operable to permit the movable object 2100 to hover in the air at a specified position and/or orientation. One or more of the propulsion mechanisms 2100 may be controlled independently of the other propulsion mechanisms. Alternatively, the propulsion mechanisms 2100 can be configured to be controlled simultaneously. For example, the movable object 2100 can have multiple horizontally oriented rotors that can provide lift and/or thrust to the movable object. The multiple horizontally oriented rotors can be actuated to provide vertical takeoff, vertical landing, and hovering capabilities to the movable object 2100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2100 (e.g., with respect to up to three degrees of translation and up to three degrees of rotation).

The sensing system 2108 can include one or more sensors that may sense the spatial disposition, velocity, and/or acceleration of the movable object 2100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2108 can be used to control the spatial disposition, velocity, and/or orientation of the movable object 2100 (e.g., using a suitable processing unit and/or control module, as described below). Alternatively, the sensing system 2108 can be used to provide data regarding the environment surrounding the movable object, such as weather conditions, proximity to potential obstacles, location of geographical features, location of manmade structures, and the like.

The communication system 2110 enables communication with terminal 2112 having a communication system 2114 via wireless signals 2116. The communication systems 2110, 2114 may include any number of transmitters, receivers, and/or transceivers suitable for wireless communication. The communication may be one-way communication, such that data can be transmitted in only one direction. For example, one-way communication may involve only the movable object 2100 transmitting data to the terminal 2112, or vice-versa. The data may be transmitted from one or more transmitters of the communication system 2110 to one or more receivers of the communication system 2112, or vice-versa. Alternatively, the communication may be two-way communication, such that data can be transmitted in both directions between the movable object 2100 and the terminal 2112. The two-way communication can involve transmitting data from one or more transmitters of the communication system 2110 to one or more receivers of the communication system 2114, and vice-versa.

In some embodiments, the terminal 2112 can provide control data to one or more of the movable object 2100, carrier 2102, and payload 2104 and receive information from one or more of the movable object 2100, carrier 2102, and payload 2104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2106), or a movement of the payload with respect to the movable object (e.g., via control of the carrier 2102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2108 or of the payload 2104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2112 can be configured to control a state of one or more of the movable object 2100, carrier 2102, or payload 2104. Alternatively or in combination, the carrier 2102 and payload 2104 can also each include a communication module configured to communicate with terminal 2112, such that the terminal can communicate with and control each of the movable object 2100, carrier 2102, and payload 2104 independently.

In some embodiments, the movable object 2100 can be configured to communicate with another remote device in addition to the terminal 2112, or instead of the terminal 2112. The terminal 2112 may also be configured to communicate with another remote device as well as the movable object 2100. For example, the movable object 2100 and/or terminal 2112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2100, receive data from the movable object 2100, transmit data to the terminal 2112, and/or receive data from the terminal 2112. Optionally, the remote device can be connected to the Internet or other telecommunications network, such that data received from the movable object 2100 and/or terminal 2112 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While illustrative embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the disclosure and that methods and structures within the scope of these claims and their equivalents be covered thereby.

What is claimed is:

1. A method for determining a target direction for a movable object, comprising:
   providing an image on a computer-implemented display;
   converting a set of screen coordinates of a selected point into a set of image coordinates in an image coordinate system to obtain a position of the selected point on the image in response to a user selecting the point on the computer-implemented display;
   determining a vector of the target direction in the image coordinate system based on the position of the selected point on the image;
   converting the vector of the target direction in the image coordinate system to a vector of the target direction in a camera coordinate system of an imaging device carried by the movable object and capturing the image;

collecting data from one or more sensors of the movable object to obtain a translation matrix;

converting, through the translation matrix, the vector of the target direction in the camera coordinate system into a vector of the target direction in a world coordinate system in which the movable object moves; and controlling the movable object based on the vector of the target direction in the world coordinate system.

2. The method of claim 1, further comprising:

effecting movement of the movable object, based on the vector of the target direction in the world coordinate system, from a reference point.

3. The method of claim 2, wherein effecting the movement of the movable object includes instructing the movable object to move, based on the vector of the target direction in the world coordinate system, in a substantially linear manner.

4. The method of claim 2, further comprising:

generating a motion path for the movable object from an initial position to the reference point, based on one or more motion characteristics of the movable object at the initial position and the reference point.

5. The method of claim 4, further comprising:

effecting the movement of the movable object along the motion path between the initial position and the reference point.

6. The method of claim 4, wherein the motion path is represented by a function of the initial position, the reference point, and the one or more motion characteristics of the movable object at the initial position and the reference point.

7. The method of claim 1, wherein the computer-implemented interface is a touch-screen device.

8. The method of claim 1, further comprising:

projecting the vector of the target direction as a graphical element onto the image in the computer-implemented display.

9. An apparatus for determining a target direction for a movable object, the apparatus comprising one or more processors that are, individually or collectively, configured to:

provide an image on a computer-implemented display;

convert a set of screen coordinates of a selected point into a set of image coordinates in an image coordinate system to obtain a position of the selected point on the image in response to a user selecting the point on the computer-implemented display;

determine a vector of the target direction in the image coordinate system based on the position of the selected point on the image;

convert the vector of the target direction in the image coordinate system to a vector of the target direction in a camera coordinate system of an imaging device carried by the movable object and capturing the image;

collect data from one or more sensors of the movable object to obtain a translation matrix;

convert, through the translation matrix, the vector of the target direction in the camera coordinate system into a vector of the target direction in a world coordinate system in which the movable object moves; and control the movable object based on the vector of the target direction in the world coordinate system.

10. The apparatus of claim 9, wherein the one or more processors are further, individually or collectively, configured to:

effect movement of the movable object, based on the vector of the target direction in the world coordinate system, from a reference point.

11. The apparatus of claim 10, wherein the one or more processors are further, individually or collectively, configured to:

instruct the movable object to move, based on the vector of the target direction in the world coordinate system, in a substantially linear manner.

12. The apparatus of claim 10, wherein the one or more processors are further, individually or collectively, configured to:

generate a motion path for the movable object from an initial position to the reference point, based on one or more motion characteristics of the movable object at the initial position and the reference point.

13. The apparatus of claim 12, wherein the one or more processors are further, individually or collectively, configured to:

effect the movement of the movable object along the motion path between the initial position and the reference point.

14. The apparatus of claim 13, wherein the one or more processors are further, individually or collectively, configured to:

instruct the movable object to move along the motion path in a substantially curvilinear manner.

15. The apparatus of claim 12, wherein the motion path is represented by a function of the initial position, the reference point, and the one or more motion characteristics of the movable object at the initial position and the reference point.

16. The apparatus of claim 9, wherein the computer-implemented interface is a touch-screen device.

17. The apparatus of claim 9, wherein the one or more processors are further, individually or collectively, configured to:

normalizing the set of image coordinates.

18. The apparatus of claim 17, wherein the vector of the target direction is determined based on the normalized set of image coordinates.

19. The apparatus of claim 9, wherein the one or more processors are further, individually or collectively, configured to:

project the vector of the target direction as a graphical element onto the image in the computer-implemented display.

20. An unmanned aerial vehicle (UAV) system comprising:

an apparatus operable to control the UAV, the apparatus comprising one or more processors that are, individually or collectively, configured to:

provide an image on a computer-implemented display;

convert a set of screen coordinates of a selected point into a set of image coordinates in an image coordinate system to obtain a position of the selected point on the image in response to a user selecting the point on the computer-implemented display;

determine a vector of the target direction in the image coordinate system based on the position of the selected point on the image;

convert the vector of the target direction in the image coordinate system to a vector of the target direction in a camera coordinate system of an imaging device carried by the UAV and capturing the image;

collect data from one or more sensors of the UAV to obtain a translation matrix;

convert, through the translation matrix, the vector of the target direction in the camera coordinate system into a vector of the target direction in a world coordinate system in which the UAV moves; and control the UAV based on the vector of the target direction in the world coordinate system.

\* \* \* \* \*